US012589910B2

(12) United States Patent
Kashiwakura et al.

(10) Patent No.: US 12,589,910 B2
(45) Date of Patent: Mar. 31, 2026

(54) METHOD FOR PRODUCING DRAWN/IRONED CAN AND DRAWN/IRONED CAN

(71) Applicant: Toyo Seikan Group Holdings, Ltd., Tokyo (JP)

(72) Inventors: Takuya Kashiwakura, Yokohama (JP); Hiromi Yamamoto, Yokohama (JP); Arata Sakuragi, Yokohama (JP); Nan Zhang, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 236 days.

(21) Appl. No.: 18/006,222

(22) PCT Filed: Jan. 24, 2022

(86) PCT No.: PCT/JP2022/002425
§ 371 (c)(1),
(2) Date: Jan. 20, 2023

(87) PCT Pub. No.: WO2022/158593
PCT Pub. Date: Jul. 28, 2022

(65) Prior Publication Data

US 2023/0348143 A1 Nov. 2, 2023

(30) Foreign Application Priority Data

Jan. 25, 2021 (JP) ................................ 2021-009723
Aug. 2, 2021 (JP) ................................ 2021-126955

(51) Int. Cl.

| | |
|---|---|
| ***B21D 22/28*** | (2006.01) |
| ***B21D 51/26*** | (2006.01) |
| ***B65D 1/16*** | (2006.01) |
| ***B65D 25/14*** | (2006.01) |
| ***C08G 63/87*** | (2006.01) |
| ***C08L 67/02*** | (2006.01) |
| ***C09D 167/02*** | (2006.01) |

(52) U.S. Cl.
CPC ............. *B65D 25/14* (2013.01); *B21D 22/28* (2013.01); *B21D 51/26* (2013.01); *B65D 1/165* (2013.01); *C08G 63/87* (2013.01); *C08L 67/02* (2013.01); *C09D 167/02* (2013.01)

(58) Field of Classification Search
CPC .............. B65D 1/165; B21D 51/26–50; B21D 51/2607
See application file for complete search history.

(56) References Cited

U.S. PATENT DOCUMENTS 5,249,447 A * 10/1993 Aizawa ................ B29C 51/426 72/46
2001/0031327 A1 10/2001 Sato et al.
2018/0065339 A1* 3/2018 Yamanaka .............. C21D 9/46
2018/0229287 A1 8/2018 Kumagai et al.
2018/0291232 A1 10/2018 Kashiwakura et al.
2019/0002724 A1* 1/2019 DeSousa ............... C09D 5/022
2021/0031981 A1 2/2021 Kitou et al.
2021/0069767 A1 3/2021 Kumagai et al.
2023/0202715 A1 6/2023 Yamamoto et al.
2024/0336804 A1 10/2024 Kashiwakura et al.
2024/0343447 A1 10/2024 Yamamoto et al.

FOREIGN PATENT DOCUMENTS

EP 2444245 B1 * 12/2015 ............ B32B 15/20
JP 2001-246695 A 9/2001
JP 2002-178049 A 6/2002
JP 2002-307604 A 10/2002
JP 2003-12904 A 1/2003
JP 2003034322 A * 2/2003
JP 3872998 B2 1/2007
JP 2015-089643 A 5/2015
JP 2019-131275 A 8/2019
JP 2020-142253 A 9/2020
WO WO-2011118160 A1 * 9/2011 ............ B65D 1/165
WO 2016/186138 A1 11/2016
WO 2017/033791 A1 3/2017
WO 2021230210 A1 11/2021
WO 2023013614 A1 2/2023
WO 2023013631 A1 2/2023

OTHER PUBLICATIONS

English machine translation for JP2003-034322 (Year: 2003).*
Translation of WO-2011118160.*
Translation of JP-2003034322.*
Extended European Search Report issued Oct. 22, 2024 in European Application No. 22742712.7.
Japanese Office Action for JP 2022-548037 dated Nov. 8, 2022.
International Search Report for PCT/JP2022/002425 dated Mar. 8, 2022.

* cited by examiner

*Primary Examiner* — Bobby Yeonjin Kim
(74) *Attorney, Agent, or Firm* — Sughrue Mion, PLLC

(57) ABSTRACT

The disclosure relates to a method for producing a drawn/ironed can, including drawing and ironing a coated metal sheet, the coated metal sheet having an inner surface coating film at least on a surface to be a can inner surface. A glass transition temperature (Tg) of a polyester resin contained in the inner surface coating film is 55° C. or higher, an ironing rate in the drawing and ironing is 40% or greater, and a processing speed during ironing in the drawing and ironing is 2000 mm/sec or higher. Thus, even in a case where a coated metal sheet having a coating film with excellent flavor sorption resistance and contains a polyester resin having a high glass transition temperature as a main component is used, occurrence of a coating film defect during molding and occurrence of coating film peeling due to heat treatment can be suppressed.

6 Claims, No Drawings

METHOD FOR PRODUCING DRAWN/IRONED CAN AND DRAWN/IRONED CAN

CROSS REFERENCE TO RELATED APPLICATIONS

This application is a National Stage of International Application No. PCT/JP2022/002425 filed Jan. 24, 2022, claiming priority based on Japanese Patent Application No. 2021-009723 filed Jan. 25, 2021 and Japanese Patent Application No. 2021-126955 filed Aug. 2, 2021.

TECHNICAL FIELD

The disclosure relates to a method for producing a drawn and ironed can (drawn/ironed can) using a coated metal sheet, and a drawn/ironed can obtained by the production method, and more particularly, to a production method capable of molding a drawn/ironed can having excellent flavor sorption resistance with good productivity without causing metal exposure and coating film peeling.

BACKGROUND

An organic resin-coated metal sheet (a thermoplastic resin-coated metal sheet) obtained by coating a metal sheet such as aluminum with a plastic film made of a thermoplastic resin (a thermoplastic resin film) has long been known as a material for cans. It has also been well known to subject the organic resin-coated metal sheet to drawing, drawing and ironing, or the like to make a seamless can that is filled with a beverage or the like, or press-mold the sheet to make a can lid such as an easy-open end. For example, an organic resin-coated metal sheet that includes, as an organic resin coating layer, a thermoplastic resin film made of a crystalline thermoplastic polyester resin mainly including ethylene terephthalate units is used as a can material for a seamless can (drawn/ironed can) molded by drawing and ironing (JP 2001-246695 A, etc.). Such an organic resin-coated metal sheet can be subjected to drawing and ironing molding under a dry condition without using coolant (cooing and lubricating agent), and thus there is an environmental advantage as compared to a case where coolant is used to subject a metal sheet to drawing and ironing molding in the related art.

Such an organic resin-coated metal sheet is produced by a method in which a pre-formed plastic film made of a thermoplastic polyester resin or the like is attached to a metal sheet by thermal adhesion, or a film lamination method such as an extrusion lamination method in which a molten thin film of an extruded thermoplastic polyester resin or the like is attached to a metal sheet.

However, in the film lamination method, for convenience of film formation, it is difficult to control a film thickness to be small, and thus the thickness of the film tends to increase, which may be problematic in terms of economic efficiency.

In place of the organic resin-coated metal sheet according to such a film lamination method, it has also been proposed to produce a drawn/ironed can under a dry condition from a coated metal sheet obtained by forming a polyester-based coating film made of a coating composition on both surfaces of a metal sheet by a coating method capable of forming a film with a small thickness.

For example, JP 3872998 B proposes a coated metal sheet for a drawn/ironed can, the coated metal sheet being a double-sided coated metal sheet and including a film to be on a can inner surface side after processing and a film to be on a can outer surface side after processing, the film to be on the can inner surface side after processing having a dry coating amount of 90 to 400 mg/100 $cm^2$ and a glass transition temperature of 50 to 120° C. and having a pencil hardness of H or greater, an elongation percentage of 200 to 600%, and a kinetic friction coefficient of 0.03 to 0.25 under a test condition of 60° C., and the film to be on the can outer surface side after processing having a dry coating amount of 15 to 150 mg/100 $cm^2$ and a glass transition temperature of 50 to 120° C. and having a pencil hardness of H or greater under a test condition of 60° C.

SUMMARY

In the drawn/ironed can made of the coated metal sheet with a polyester-based coating film formed on both of its surfaces as described above, the polyester-based inner surface coating film formed on the inner surface side to be in contact with a content thereof may be required not to impair savor and flavor of the content, that is, to suppress elution of coating material components or the like, and not to sorb a flavor (perfume) component of the content (flavor sorption resistance). In order to form a coating film having excellent flavor sorption resistance, it is preferable to use a polyester resin having a high glass transition temperature as a main component. However, a coating film made of the polyester resin having a high glass transition temperature tends to have poor can forming processability, and depending on molding conditions, a coating film defect may be generated during processing to exposure metal, so that the coating film covering property of the can inner surface may be reduced.

In addition, in a drawn/ironed can formed from the coated metal sheet under a dry condition, when heat treatment is applied to remove residual stress in the coating film caused by processing after molding the can body, along with relaxation of the residual stress in the coating film generated by severe processing, shrinkage force acts on the interface between the coating film and the metal substrate, and in particular, in a thinned site of a can trunk portion where processing is severe, coating film peeling may occur. In the coating film made of the polyester resin having a high glass transition temperature as described above, the residual stress after processing tends to increase, and in this case, the shrinkage force described above also increases, so that coating film peeling is likely to occur during heat treatment, and the coating film covering property of the can inner surface may be further reduced.

The above-described JP 3872998 B proposes a coated metal sheet capable of withstanding drawing and ironing by forming, on a surface of the coated metal sheet to be on the can inner surface side, a polyester-based coating film that can maintain hardness, elongation percentage, and the like even when heat near 60° C. is generated by consecutive drawing and ironing, and a drawn/ironed can molded from the coated metal sheet. However, there is no finding on prevention of occurrence of a coating film defect during molding and coating film peeling due to heat treatment after molding processing while maintaining the good flavor sorption resistance, and thus JP 3872998 B does not solve such issues.

Accordingly, an object of the disclosure is to provide a method for producing a drawn/ironed can with good productivity, the drawn/ironed can having excellent flavor sorption resistance in which occurrence of a coating film defect during molding and occurrence of coating film peeling due to heat treatment after molding can be suppressed to maintain good flavor sorption resistance even in a case where a coated metal sheet having a coating film made of a polyester resin having a high glass transition temperature, and having excellent coating film covering property and corrosion resistance in which there are few metal exposure portions.

In addition, another object of the disclosure is to provide a drawn/ironed can having excellent coating film covering property and corrosion resistance in which there are few metal exposure portions, while maintaining flavor sorption resistance.

According to the disclosure, there is provided a method for producing a drawn/ironed can, including drawing and ironing a coated metal sheet to obtain a drawn/ironed can, the coated metal sheet having an inner surface coating film at least on a surface to be a can inner surface, the inner surface coating film containing a polyester resin, where a glass transition temperature (Tg) of the polyester resin is 55° C. or higher, an ironing rate in the drawing and ironing is 40% or higher, and a processing speed in ironing during drawing and ironing is 2000 mm/sec or higher.

In the method for producing a drawn/ironed can according to the disclosure, preferably, 1. the inner surface coating film has a glass transition temperature of 55° C. or higher,
2. the inner surface coating film further contains a curing agent, the curing agent being a resol-type phenolic resin and/or an amino resin,
3. the coated metal sheet further has an outer surface coating film on a surface to be a can outer surface, the outer surface coating film containing a polyester resin,
4. a degree of coverage of the inner surface coverage of the drawn/ironed can is 200 mA or less in terms of ERV, and
5. heat treatment is applied at a temperature of 55° C. or higher after the drawing and ironing.

According to the disclosure, there is also provided a drawn/ironed can having an inner surface coating film at least on a can inner surface side, the inner surface coating film containing a polyester resin as a main component, where the inner surface coating film has a glass transition temperature (Tg) of 55° C. or higher, and the degree of coverage of the inner surface coating film is 200 mA or less in terms of ERV.

In the drawn/ironed can of the disclosure, preferably, 1. the inner surface coating film further contains a curing agent, the curing agent being a resol-type phenolic resin and/or an amino resin,
2. the inner surface coating film contains no curing agent,
3. the drawn/ironed can further includes an outer surface coating film on a can outer surface side, the outer surface coating film containing a polyester resin,
4. a thickness of a central portion of a can trunk is 60% or less of a thickness of a central portion of a can bottom,
5. a thickness of the inner surface coating film in the central portion of the can trunk is 60% or less of a thickness of the inner surface coating film in the central portion of the can bottom,
6. a thickness ratio of the inner surface coating film and a metal substrate (thickness of the inner surface coating film/thickness of the metal substrate) is substantially identical between the can bottom portion and the can trunk portion,
7. a heat shrinkage rate of the inner surface coating film in the central portion of the can trunk represented by the following formula (1) is 30% or less:

$$\text{heat shrinkage rate (\%)}=(\Delta L_1/L_0)\times 100 \qquad (1)$$

$L_0$: an initial length of the coating film isolated from the central portion of the can trunk in a height direction $\Delta L_1$: a maximum shrinkage length, in the height direction, of the coating film of a portion corresponding to $L_0$ when temperature is raised from 30° C. to 200° C. at a temperature raising rate of 5° C./min while applying a load of $5.20\times10^5$ N/m$^2$ per unit area, and 8. an elongation percentage of the inner surface coating film in the can bottom portion is less than 200% under a test condition of 60° C.

In order to ensure sufficient flavor sorption resistance in the drawn/ironed can made of the coated metal sheet described above, it is desirable to use a polyester resin having a high glass transition temperature as the polyester resin contained as a main component in the inner surface coating film. However, in a case where the polyester resin having a high glass transition temperature is used, elongation and can forming processabilty of the coating film tend to decrease, and thus, in a case where a drawn/ironed can is molded under a dry condition, a coating film defect is likely to be generated during processing, so that a metal exposure portion may be generated to reduce the coating film covering property of the inner surface.

The present inventors have found that even in a case where the glass transition temperature of the polyester resin contained as a main component in the inner surface coating film is high, by setting a molding speed (processing speed) in drawing and ironing to 2000 mm/sec or higher, it is possible to efficiently produce a drawn/ironed can without reducing the coating film covering property of the inner surface.

In other words, in the drawn/ironed can obtained by the production method according to the disclosure, the glass transition temperature of the polyester resin contained in the inner surface coating film of the coated metal sheet subjected to drawing and ironing is 55° C. or higher, which is high, and thus the flavor sorption resistance is excellent. In addition, high-speed processing generates great heat to soften the coating film, thereby significantly improving the elongation and can forming processability of the coating film, and thus, even in a case where a polyester resin having a high glass transition temperature is used, it is possible to prevent a coating film defect and metal exposure during molding and improve the coating film covering property of the can inner surface. Furthermore, large processing heat can reduce residual stress in the coating film after processing, and thus occurrence of coating film peeling during heat treatment as described above is effectively suppressed. As a result, in the obtained drawn/ironed can, metal exposure is effectively prevented, and even after heat treatment, the degree of coverage of the inner surface coating film expressed in terms of ERV can be 200 mA or less, which makes it possible to exhibit excellent corrosion resistance.

It is apparent from results of Examples described below that the drawn/ironed can obtained by the method for producing a drawn/ironed can according to the disclosure has excellent flavor sorption resistance and has an excellent coating film covering property of the inner surface.

That is, in a drawn/ironed can obtained by using a coated metal sheet having an inner surface coating film made of a polyester resin having a glass transition temperature of 55° C. or higher and being subjected to drawing and ironing at a molding speed of 2000 mm/sec or higher, the degree of coverage of the inner surface coating film is 200 mA or less in terms of the ERV, which is a satisfactory covering property, and a limonene sorption rate of the coating film ($2.5\times5$ cm$^2$) is less than 5% after the coating film is stored in a Duran bottle in a sealed manner with a limonene 2 ppm-containing model liquid under conditions at 30° C. for 14 days (Examples 1 to 9). On the other hand, in a drawn/ironed can molded by drawing and ironing in the same manner as Examples except that it is molded at a molding speed of 1000 mm/sec, the limonene sorption rate is less than 5%, but the degree of coverage of the inner surface coating film is higher than 200 mA in terms of ERV, so that a satisfactory coating film covering property of the inner surface is not obtained (Comparative Examples 1 to 3), which also makes it apparent that the drawn/ironed can obtained by the method for producing a drawn/ironed can according to the disclosure has excellent flavor sorption resistance and has an excellent coating film covering property of the inner surface.

In addition, in the method for producing a drawn/ironed can according to the disclosure, even when subjected to severe processing such as drawing or ironing under a dry condition, not only breakage in the can trunk portion (in the disclosure, sometimes referred to as trunk breakage) but also metal exposure is effectively prevented, and thus excellent can forming processability is achieved, At the same time, it is possible to effectively suppress coating film peeling during heat treatment, and it is possible to effectively prevent metal exposure even after heat treatment.

BRIEF DESCRIPTION OF EMBODIMENTS

Coated Metal Sheet

A coated metal sheet used in the method for producing a drawn/ironed can according to the disclosure is a coated metal sheet obtained by coating a meta sheet with a coating composition, the coated metal sheet having an inner surface coating film at least on a surface to be a can inner surface after drawing and ironing, in which the inner surface coating film contains a polyester resin having a glass transition temperature of 55° C. or higher as a main component, and desirably further contains a curing agent.

Desirably, the glass transition temperature (Tg) of the inner surface coating film is in a range of 55° C. or higher, preferably from 55 to 120° C., more preferably from 60 to 110° C., further preferably from 65° C. to 100° C., particularly preferably higher than 65° C. and 95° C. or lower, and most preferably from 67 to 90° C. In a case where Tg is lower than the above range, when a can body after molding is filled with a content, a flavor component of the content is likely to be sorbed, which may result in poor flavor sorption resistance, and a barrier property of the coating film is reduced, which may result in poor corrosion resistance. On the other hand, in a case where Tg is higher than 120° C., elongation of the coating film may be reduced and metal exposure may occur by molding, which results in poor can forming processability, and residual stress in the coating film may increase to cause coating film peeling during heat treatment, which results in a poor coating film covering property of the inner surface.

In addition, the coated metal sheet used in the method for producing a drawn/ironed can according to the disclosure is desirably a double-sided coated metal sheet further having an outer surface coating film on a surface to be on the can outer surface side after drawing and ironing, and more desirably, the outer surface coating film contains a polyester resin as a main component, and preferably further contains a curing agent.

Preferably, Tg of the outer surface coating film is in a range of 30° C. or higher, preferably higher than 40° C., more preferably higher than 50° C. and 120° C. or lower, further preferably from 55° C. to 110° C., particularly preferably 65 to 100° C. or lower, and most preferably from 67 to 90° C. In a case where Tg is lower than the range described above, hardness of the coating film is reduced, and thus, external surface defects such as coating film scratch may occur. On the other hand, in a case where Tg is higher than 120° C., the processability and elongation of the coating film are reduced, and metal exposure may occur by molding, which results in poor can forming processability.

By using the coated metal sheet having at least the inner surface coating film on the surface to be the can inner surface as described above to mold the drawn/ironed can, it is possible to cover the entirety with the inner surface coating film continuous from the bottom portion to the trunk portion on the can inner surface side.

Furthermore, in a case where a double-sided coated metal sheet also having the outer surface coating film on the surface to be the can outer surface after drawing and ironing is used, it is also possible to cover the entirety with the outer surface coating film continuous from the bottom portion to the trunk portion on the can outer surface side.

Furthermore, the elongation percentage of the inner surface coating film is preferably less than 200% under a test condition of 60° C. In other words, as described above, in the method for producing a drawn/ironed can according to the disclosure, ironing is performed at the processing speed of 2000 mm/sec or higher, which is a high speed, and thus, processing heat is increased, which results in a high temperature state exceeding the glass transition temperature of the polyester resin, thereby improving the can forming processability (elongation) of the coating film. As a result, even when the inner surface coating film has an elongation percentage of less than 200% under the test conditions of 60° C., satisfactory can forming processability and good flavor sorption resistance can be achieved. On the other hand, in a case where the elongation percentage under the test condition of 60° C. is 200% or higher, the flavor sorption resistance is deteriorated.

Furthermore, preferably, the film thickness of the inner surface coating film is in a range of from 0.2 to 20 μm, preferably from 1 to 12 μm, and more preferably greater than 2 μm and 12 μm or less, as a dry film thickness. In addition, preferably, the dry coating film mass is in a range of from 3 to 300 $mg/dm^2$, preferably from 15 to 150 $mg/dm^2$, and more preferably greater than 25 $mg/dm^2$ and 150 $mg/dm^2$ or less. In a case of a thinner film than the above range, metal exposure is likely to occur during molding, leading to a poor covering property of the inner surface coating film. On the other hand, in a case of a thicker film than in the above range, the residual stress generated during processing increases, so that coating film peeling becomes more likely to occur during heat treatment after drawing and ironing, and the film thickness increases beyond necessity, which results in inferior economic efficiency.

Furthermore, in a case where a content to be filled in the drawn/ironed can is an acidic beverage having a strong corrosive property, it is necessary to make the film thickness relatively large to ensure corrosion resistance, and thus, preferably, the thickness is in a range of greater than 6 μm and 12 μm or less, and preferably from 6.5 to 10 μm. In addition, preferably, the dry coating film mass is in a range of greater than 85 $mg/dm^2$ and 150 $mg/dm^2$ or less, and preferably from 90 to 140 $mg/dm^2$. In a case of a thinner film than the above range, the corrosion resistance is inferior, and in a case of exceeding the above range, coating film peeling becomes likely to occur during heat treatment after drawing and ironing molding.

On the other hand, in a case where a content to be filled in the drawn/ironed can is a low acidic beverage or the like having a relatively weak corrosive property, the corrosion resistance can be ensured even in a relatively thin film, and thus the thickness is in a range of 1 μm or greater and less than 6.5 μm, preferably greater than 2 μm and less than 6.5 μm, and more preferably from 2.5 to 6 μm. Furthermore, preferably, the dry coating film mass is in a range of 15 $mg/dm^2$ or greater and less than 90 $mg/dm^2$, preferably greater than 25 $mg/dm^2$ and less than 90 $mg/dm^2$, and more preferably from 30 to 85 $mg/dm^2$. In a case of a thinner film than the above range, the corrosion resistance is inferior, and in a case of exceeding the above range, the thickness becomes large beyond necessity, which results in inferior economic efficiency.

Furthermore, preferably, the film thickness of the outer surface coating film is in a range of from 0.2 to 20 μm, preferably from 1 to 12 μm, more preferably greater than 2 μm and 10 μm or less, and further preferably greater than 2 μm and 6.5 μm or less, as the dry film thickness. In addition, preferably, the dry coating film mass is in a range of from 3 to 300 $mg/dm^2$, preferably from 15 to 150 $mg/dm^2$, more preferably greater than 25 $mg/dm^2$ and 140 $mg/dm^2$ or less, and further preferably greater than 25 $mg/dm^2$ and less than 90 $mg/dm^2$. In a case of a thinner film than the above range, metal exposure is likely to occur during molding, leading to a poor covering property of the coating film on the outer surface. On the other hand, in a case of a thicker film than the above range, the residual stress generated during processing increases, and thus coating film peeling becomes likely to occur during heat treatment after drawing and ironing molding.

Note that, with respect to the film thicknesses of the inner surface coating film and the outer surface coating film of the coated metal sheet, it is preferable that the inner surface coating film required to have a higher covering property is thicker than the outer surface coating film.

In the inner surface coating film of the coated metal sheet, the content of the polyester resin, preferably a non-crystalline polyester resin described below, is preferably greater than 50 mass %, more preferably 60 mass % or greater, further preferably 70 mass % or greater, and particularly preferably 80 mass % or greater.

Similarly, in the outer surface coating film, the content of the polyester resin, preferably a non-crystalline polyester resin, is preferably greater than 50 mass %, more preferably 60 mass % or greater, further preferably 70 mass % or greater, and particularly preferably 80 mass % or greater.

Polyester Resin

In the coated metal sheet used in the method for producing a drawn/ironed can according to the disclosure, a polyester resin is used as a main component constituting the inner surface coating film and the outer surface coating film, and herein, the main component is defined as a component having the highest content (mass ratio) among components constituting the coating film. Note that in the disclosure, a mass ratio occupied by the polyester resin among resin components constituting the inner surface coating film and the outer surface coating film is preferably greater than 50 mass %, more preferably 60 mass % or greater, further preferably 70 mass % or greater, and particularly preferably 80 mass % or greater.

Desirably, the glass transition temperature (Tg) of the polyester resin contained as a main component in the inner surface coating film is in a range of 55° C. or higher, preferably from 55 to 120° C., more preferably from 60 to 110° C., further preferably from 65° C. to 100° C., particularly preferably higher than 65° C. and 95° C. or lower, and most preferably from 67 to 90° C. When Tg is lower than the above range, when a drawn/ironed can as described above is filled with a content, moisture in the content acts as a kind of plasticizer, and mobility of molecular chains of the polyester resin becomes higher, so that flavor components contained in the content become likely to diffuse into the coating film to increase a sorption amount, resulting in poor flavor sorption resistance. Furthermore, water resistance of the coating film decreases, which may also result in inferior corrosion resistance and retort resistance. On the other hand, in a case where Tg is higher than 120° C., elongation of the coating film decreases and metal exposure may occur by molding, which results in poor can forming processability, and residual stress in the coating film after molding is increased and the coating film may be peeled off during heat treatment, which results in a poor coating film covering property of the inner surface.

Preferably, the glass transition temperature (Tg) of the polyester resin contained as a main component in the outer surface coating film is in a range of 30° C. or higher, preferably higher than 40° C., more preferably higher than 50° C. and 120° C. or lower, further preferably from 55° C. to 110° C., particularly preferably from 65° C. to 100° C., and most preferably from 67 to 90° C. In a case where Tg is lower than the range described above, hardness of the coating film is reduced, and thus, external surface defects such as coating film scratch may occur. On the other hand, in a case where Tg is higher than 120° C., elongation of the coating film is reduced to deteriorate the can forming processability, and metal exposure may occur by molding.

In the disclosure, two or more types of polyester resins having each different Tg can be blended for use and by blending polyester resins having each different Tg, it may be possible to form a coating film that is excellent in impact resistance and unlikely to generate a coating film defect even when subjected to external impact.

In the case as well, it is sufficient that $Tg_{mix}$ of the polyester resin blend calculated by the following formula (2) is within the Tg range described above:

$$1/Tg_{mix}=(W1/Tg1)+(W2/Tg2)+ \ldots +(Wm/Tgm) \ldots \quad W1+W2+ \ldots +Wm=1 \tag{2}$$

In the formula, $Tg_{mix}$ represents the glass transition temperature (K) of the polyester resin blend, and Tg1, Tg2, . . . , and Tgm each represent the glass transition temperature (K) of each of polyester resins used (polyester resin 1, polyester resin 2, . . . , and polyester resin m). W1, W2, . . . , and Wm each represent a mass fraction of each of the polyester resins (polyester resin 1, polyester resin 2, . . . , and polyester resin m).

A known method can be applied as a method for measuring a glass transition temperature, and, for example, measurement can be performed at a temperature raising rate of 10° C./minute using a differential scanning calorimeter (DSC).

Examples of a polyvalent carboxylic acid component constituting the polyester resin include: aromatic dicarboxylic acids such as terephthalic acid, isophthalic acid, orthophthalic acid, and 2,6-naphthalenedicarboxylic acid; aliphatic dicarboxylic acids such as succinic acid, glutaric acid, adipic acid, azelaic acid, sebacic acid, dodecanedioic acid, and dimer acid; unsaturated dicarboxylic acids such as maleic acid (maleic anhydride), fumaric acid, and terpene-maleic adducts; alicyclic dicarboxylic acids such as 1,4-cyclohexanedicarboxylic acid, tetrahydrophthalic acid, hexahydroisophthalic acid, and 1,2-cyclohexenedicarboxylic acid; and trivalent or higher valent carboxylic acids such as trimellitic acid (trimellitic anhydride), pyromellitic acid (pyromellitic anhydride), and methylcyclohexenetricarboxylic acid. From these, one, or two or more can be selected and used. Among the polyvalent carboxylic acids described above, it is preferable to use one or more selected from the group consisting of isophthalic acid, orthophthalic acid, terephthalic acid, 2,6-naphthalenedicarboxylic acid, trimellitic acid, adipic acid, sebacic acid, fumaric acid, maleic acid, dimer acid, and 1,4-cyclohexanedicarboxylic acid.

In the disclosure, from the perspective of hardness, heat resistance, flavor sorption resistance, retort resistance, and the like of the resulting coating film, when the total amount of polyvalent carboxylic acid components constituting the polyester resin is 100 mol %, it is preferable to contain at least one, or two or more selected from terephthalic acid, orthophthalic acid, isophthalic acid, and 2,6-naphthalenedicarboxylic acid, each of which is an aromatic dicarboxylic acid, in a total amount of 70 mol % or greater, preferably 80 mol % or greater, and more preferably 90 mol % or greater. In addition, among the aromatic dicarboxylic acids described above, terephthalic acid and isophthalic acid are particularly preferable, and when the total amount of the polyvalent carboxylic acid components constituting the polyester resin is 100 mol %, preferably, the total amount of terephthalic acid and isophthalic acid is 70 mol % or greater, preferably 80 mol % or greater, and further preferably 90 mol % or greater. In a case where a blend body of two or more polyester resins is used as the polyester resin, when the total amount of all polyvalent carboxylic acid components constituting the blend body of the polyester resins is 100 mol %, it is preferable to contain at least one, or two or more selected from terephthalic acid, orthophthalic acid, isophthalic acid, and 2,6-naphthalenedicarboxylic acid, each of which is an aromatic dicarboxylic acid, in a total amount of 70 mol % or greater, preferably 80 mol % or greater, and more preferably 90 mol % or greater. In addition, when the total amount of all polyvalent carboxylic acid components constituting the blend body of the polyester resins is 100 mol %, more preferably, the total content of terephthalic acid and isophthalic acid is preferably 70 mol % or greater, preferably 80 mol % or greater, and further preferably 90 mol % or greater.

Note that, as the polyvalent carboxylic acid components constituting the polyester resin, a component other than the aromatic dicarboxylic acids, for example, an aliphatic dicarboxylic acid such as adipic acid or sebacic acid, may be contained in an amount of the remaining proportion of the aromatic dicarboxylic acids, that is, in an amount of less than 30 mol %. However, it is presumed that when a proportion of the component such as the aliphatic dicarboxylic acid other than the aromatic dicarboxylic acids increases, the flavor sorption resistance of the coating film is reduced. Thus, desirably, the proportion occupied by a component such as the aliphatic dicarboxylic acid component other than the aromatic dicarboxylic acids in the polyvalent carboxylic acid components constituting the polyester resin is less than 30 mol %, preferably less than 20 mol %, more preferably less than 10 mol %, and particularly preferably less than 5 mol %. In a case where a blend body of two or more polyester resins is used as the polyester resin, desirably, when the total amount of all the polyvalent carboxylic acid components constituting the blend body of the polyester resins is 100 mol %, desirably, the proportion of the component such as the aliphatic dicarboxylic acid component other than the aromatic dicarboxylic acids is less than 30 mol %, preferably less than 20 mol %, more preferably 10 mol %, and particularly preferably less than 5 mol %.

The polyhydric alcohol component constituting the polyester resin is not particularly limited, and examples thereof include: aliphatic glycols, such as ethylene glycol, propylene glycol (1,2-propanediol), 1,3-propanediol, 1,4-butanediol, 1,2-butanediol, 1,3-butanediol, 2-methyl-1,3-propanediol, neopentyl glycol, 1,5-pentanediol, 1,6-hexanediol, 3-methyl-1,5-pentanediol, 2-ethyl-2-butyl-1,3-propanediol, 2,4-diethyl-1,5-pentanediol, 1-methyl-1,8-octanediol, 3-methyl-1,6-hexanediol, 4-methyl-1,7-heptanediol, 4-methyl-1,8-octanediol, 4-propyl-1,8-octanediol, and 1,9-nonanediol; ether glycols, such as diethylene glycol, triethylene glycol, polyethylene glycols, polypropylene glycol, and polytetramethylene glycol; alicyclic polyalcohols, such as 1,4-cyclohexanedimethanol, 1,3-cyclohexanedimethanol, 1,2-cyclohexanedimethanol, and tricyclodecane glycols; and trihydric or higher polyalcohols, such as trimethylolpropane, trimethylolethane, and pentaerythritol. From these, one, or two or more can be combined and used. In the disclosure, among the polyhydric alcohol components described above, ethylene glycol, propylene glycol, neopentyl glycol, 1,4-butanediol, 1,4-cyclohexanedimethanol, or diethylene glycol can be preferably used as a component constituting the polyester resin.

In particular, when the total amount of the polyhydric alcohol components constituting the polyester resin is 100 mol %, it is suitable to contain at least one, or two or more selected from ethylene glycol, propylene glycol, and 2-methyl-1,3-propanediol in a total amount of 20 mol % or greater, preferably 30 mol % or greater, more preferably 40 mol % or greater, further preferably 50 mol % or greater, particularly preferably 60 mol % or greater, and most preferably 70 mol % or greater, from the perspective of flavor sorption resistance. Also in a case where a blend body of two or more polyester resins is used as the polyester resin, in the total amount of all the polyhydric alcohol components constituting the blend body of the polyester resins, it is suitable to contain at least one, or two or more selected from ethylene glycol, propylene glycol, and 2-methyl-1,3-propanediol in a total amount of 20 mol % or greater, preferably 30 mol % or greater, more preferably 40 mol % or greater, further preferably 50 mol % or greater, particularly preferably 60 mol % or greater, and most preferably 70 mol % or greater, from the perspective of flavor sorption resistance.

The polyester resin can be produced by a known method such as polycondensation of one or more types of the polyvalent carboxylic acid components described above and one or more types of the polyhydric alcohol components described above, a method of depolymerization after polycondensation with a polyvalent carboxylic acid component such as terephthalic acid, isophthalic acid, trimellitic anhydride, trimellitic acid, or pyromellitic acid, or ring-opening addition of an acid anhydride such as phthalic anhydride, maleic anhydride, trimellitic anhydride, or ethylene glycol bis-trimellitate dianhydride after polycondensation.

From the perspective of curability, retort whitening resistance, adhesion to the metal substrate, and the like, desirably, an acid value of the polyester resin is in a range of from 0.1 to 40 mg KOH/g, preferably from 0.5 to 25 mg KOH/g, more preferably from 1 to 10 mg KOH/g, further preferably higher than 2.5 mg KOH/g and 10 mg KOH/g or less, particularly preferably from 2.5 to 8 mg KOH/g, and most preferably from 3 to 7 mg KOH/g. In a case where the acid value is lower than the above range, the adhesion of the metal substrate and the coating film may be reduced. On the other hand, in a case where the acid value is higher than the above range, as compared to a case where the acid value is in the above range, the coating film becomes likely to absorb water, which may reduce the retort whitening resistance, and the crosslinking density of the coating film becomes high, and can forming processability and coating film peeling resistance are reduced, which may reduce the coating film covering property.

Note that in a case where the polyester resin is a blend body in which two or more types of polyester resins are blended, the sum of the values each obtained by multiplying an acid value and a mass fraction of each of the polyester resins is defined as an average acid value of the blend body ($AV_{mix}$), and the average acid value is only required to be within the acid value range described above.

A hydroxyl value of the polyester resin is not limited to, but in a range of 20 mg KOH/g or less, preferably 10 mg KOH/g or less, more preferably from 1 to 10 mg KOH/g, and further preferably from 2 to 10 mg KOH/g, desirably from the perspective of can forming processability, coating film peeling during heat treatment, retort whitening resistance, and the like.

The number average molecular weight (Mn) of the polyester resin is not limited to, but in a range of from 1000 to 100000, preferably from 3000 to 50000, more preferably from 5000 to 30000, and further preferably from 10000 to 20000, preferably from the perspective of can forming processability. When Mn is smaller than the above range, the coating film may become brittle to be poor in the can forming processability, and when Mn is greater than the above range, the paint stability may be reduced.

Furthermore, the polyester resin is preferably a non-crystalline polyester resin from the perspective of can forming processability, dent resistance, and coating material formation. Here, "non-crystalline" means that no clear melting point of a crystalline component is exhibited in measurement by a differential scanning calorimeter (DSC). As compared to a crystalline polyester resin, the non-crystalline polyester resin has an excellent solubility in a solvent and is easily made into a coating material, and it is possible to form a coating film excellent in can forming processability and dent resistance. Note that in the disclosure, a mass ratio occupied by the non-crystalline polyester resin among all the polyester resin components contained in the inner surface coating film and/or the outer surface coating film is preferably greater than 40 mass %, more preferably 50 mass % or greater, further preferably 60 mass % or greater, particularly preferably 70 mass % or greater, and most preferably 80 mass % or greater.

Curing Agent

It is desirable that the inner surface coating film and the outer surface coating film of the coated metal sheet used in the method for producing a drawn/ironed can according to the disclosure further contain a curing agent, in addition to the polyester resin described above. The curing agent reacts with a functional group, such as a carboxyl group or a hydroxyl group, of the polyester resin as the main component to form a crosslinking structure, which can significantly improve the heat resistance, the retort whitening resistance, and the like of the coating film. In particular, in a case where a content to be filled in the drawn/ironed can requires retort treatment after filling, the inner surface coating film and the outer surface coating film desirably contain the curing agent.

Examples of such a curing agent can include an isocyanate compound, a resol-type phenolic resin, an amino resin, an epoxy group-containing compound, an oxazoline group-containing compound, a carbodiimide group-containing compound, a β-hydroxyalkylamide compound, and the like. In particular, a resol-type phenolic resin and an amino resin are suitable from the perspective of curability, hygiene, and the like.

In the coated metal sheet and the drawn/ironed can of the disclosure, as a coating composition for forming the inner surface coating film (hereinafter, sometimes referred to as "coating composition for inner surface"), a resol-type phenolic resin or an amino resin is suitable, and in particular, a resol-type phenolic resin can be preferably used from the perspective of can forming processability. As a coating composition for forming the outer surface coating film (hereinafter, sometimes referred to as "outer surface coating composition"), an amino resin that can form a transparent coating film without coloring derived from the curing agent can be preferably used. On the other hand, a coating film to be formed becomes yellow, and thus attention needs to be paid in a case where the resol-type phenolic resin described above is used in the coating composition for forming the outer surface coating film.

Resol-Type Phenolic Resin

The resol-type phenolic resin is a resin obtained by reacting a phenolic compound and formaldehyde in the presence of an alkaline catalyst. Examples of the phenolic compound used include o-cresol, p-cresol, p-tert-butylphenol, p-ethylphenol, 2,3-xylenol, 2,5-xylenol, phenol, m-cresol, m-ethylphenol, 3,5-xylenol, and m-methoxyphenol. From these, one, or two or more can be mixed and used.

From the perspective of curability, among the above phenolic compounds, a resol-type phenolic resin containing a phenolic compound that becomes three-functional in the reaction with formaldehyde as a starting raw material in an amount of greater than 20 mass %, preferably greater than 30 mass %, more preferably greater than 50 mass %, further preferably 60 mass % or greater, and particularly preferably 80 mass % or greater is preferable. Examples of the phenolic compound that becomes three-functional in the reaction with formalin include phenol, m-cresol, m-ethylphenol, 3,5-xylenol, and m-methoxyphenol, and among these, one, or two or more can be selected and used. When the amount of these trifunctional phenolic compounds is 20 mass % or less, sufficient curability cannot be achieved, so that the degree of curing of the coating film may decrease. Among these three-functional phenolic compounds, from the perspective of curability, m-cresol is more preferable, and a resol-type phenolic resin containing m-cresol as a main component of a starting raw material (hereinafter, sometimes referred to as "m-cresol-based resol-type phenolic resin") is particularly preferable. As a result, it is possible to achieve a sufficient degree of curing of the coating film, which is desirable from the perspective of heat resistance, corrosion resistance, retort whitening resistance, and the like of the coating film. Note that the main component herein is defined as a component having the highest content (mass ratio) among phenol compounds serving as the starting raw material. As the m-cresol-based resol-type phenolic resin, desirably, one containing m-cresol as a starting raw material in an amount of greater than 50 mass %, preferably greater than 60 mass % or greater, more preferably greater than 70 mass %, and further preferably 80 mass % or greater is desirable.

Other than the above phenolic compounds that become three-functional, in a case where a phenolic compound that becomes bifunctional in the reaction with formaldehyde is used as the starting raw material, preferably, the content thereof is less than 50 mass %, preferably less than 30 mass %, and more preferably less than 20 mass %. When it is 50 mass % or greater, the curability may decrease. Examples of the phenol compound to be bifunctional include o-cresol, p-cresol, p-tert-butylphenol, p-ethylphenol, 2,3-xylenol, 2,5-xylenol, and the like.

Furthermore, as the resol-type phenolic resin used in the disclosure, from the perspective of compatibility with the polyester resin and curability, it is possible to preferably use one obtained by alkyl-etherifying (alkoxy-methylating) a part or all of methylol groups contained with alcohols having 1 to 12 carbon atoms. The proportion of the methylol groups to be alkyl-etherified is preferably 50% or greater, more preferably 60% or greater, and further preferably 80% or greater. When the proportion of alkyl etherification is less than 50%, the compatibility with the polyester resin becomes low, and the coating film may have a turbidity, or sufficient curability cannot be achieved. Examples of the alcohol used in alkyl etherification include monovalent alcohols having from 1 to 8 carbon atoms, preferably from 1 to 4 carbon atoms, and examples of suitable monovalent alcohols can include methanol, ethanol, n-propanol, n-butanol, isobutanol, and the like, and n-butanol is more preferable.

The number of the alkyl-etherified methylol groups (alkoxy methyl groups) is preferably 0.3 or greater, preferably from 0.5 to 3, as the average of the alkoxy methyl groups per phenol nucleus. When the number is less than 0.3, curability with the polyester resin is deteriorated. The number average molecular weight (Mn) of the resol-type phenolic resin is preferably in a range of from 500 to 3000, preferably from 800 to 2500. When Mn is smaller than the above range, the crosslinking density of the coating film formed tends to increase, and thus residual stress in the coating film after can forming processing is increased, so that the coating film may be peeled off during heat treatment. On the other hand, when Mn is larger than the above range, the curability is deteriorated and as a result, the heat resistance and corrosion resistance, retort whitening resistance, and the like of the coating film may be deteriorated.

Amino Resin

Examples of the amino resin include a methylolated amino resin obtained by reaction of an amino component such as melamine, urea, benzoguanamine, acetoguanamine, steroguanamine, spiroguanamine, or dicyandiamide, and an aldehyde component such as formaldehyde, paraformaldehyde, acetaldehyde, or benzaldehyde. One obtained by alkyl-etherifying a part or all of the methylol groups of the methylolated amino resin by an alcohol having 1 to 12 carbon atoms is also included in the above amino resin. These can be used alone or in combination of two or more. As the amino resin, from the perspective of hygiene, can forming processability, curability, and the like, a methylolated amino resin using benzoguanamine (benzoguanamine resin), a methylolated amino resin using melamine (melamine resin), or a methylolated amino resin using urea (urea resin) is preferable, the benzoguanamine resin or the melamine resin is more preferable, and the benzoguanamine resin is further preferable.

As the benzoguanamine resin, benzoguanamine resins obtained by alkyl-etherifying a part or all of the methylol groups of a benzoguanamine resin with an alcohol such as methanol, ethanol, n-butanol, or i-butanol, for example, a methyl-etherified benzoguanamine resin, an ethyl-etherified benzoguanamine resin, a butyl-etherified benzoguanamine resin, or a mixed-etherified benzoguanamine resin of methyl ether and butyl ether, a mixed-etherified benzoguanamine resin of methyl ether and ethyl ether, and a mixed-etherified benzoguanamine resin of ethyl ether and butyl ether are preferable. Among these, the methyl-etherified benzoguanamine resin and the butyl-etherified benzoguanamine resin are more preferable.

As the melamine resin, a melamine resin obtained by alkyl-etherifying a part or all of methylol groups of a melamine resin by an alcohol such as methanol, ethanol, n-butanol, or i-butanol, for example, a methyl-etherified melamine resin, an ethyl-etherified melamine resin, a butyl-etherified melamine resin, or a mixed etherified melamine resin of methyl ether and butyl ether, a mixed etherified melamine resin of methyl ether and ethyl ether, and a mixed etherified melamine resin of ethyl ether and butyl ether are preferable. Among these, the methyl-etherified melamine resin is more preferable, and a methyl-etherified melamine resin of a full etherification type is particularly preferable.

As the urea resin, a urea resin obtained by alkyl-etherifying a part or all of methylol groups of a urea resin by an alcohol such as methanol, ethanol, n-butanol, or i-butanol, for example, a methyl-etherified urea resin, an ethyl-etherified urea resin, a butyl-etherified urea resin, or a mixed etherified urea resin of methyl ether and butyl ether, a mixed etherified urea resin of methyl ether and ethyl ether, and a mixed etherified urea resin of ethyl ether and butyl ether are preferable.

Examples of the functional groups included in the melamine resin and the benzoguanamine resin described above include an imino group (>NH), an N-methylol group (>$NCH_2OH$), and an N-alkoxymethyl group (>$NCH_2OR$; R is an alkyl group), and these functional groups act as a reaction point in a crosslinking reaction with a carboxyl group (—COOH) or a hydroxyl group (—OH) contained in the polyester resin, which is a main agent, or a self-condensation reaction between amino resins (note that the imino group only contributes to the self-condensation reaction). Note that with respect to the number of the reaction points (functional groups) described above, when compared between monomers of the melamine resin and the benzoguanamine resin, it is thought that the number of the reaction points of the melamine resin is larger based on the molecular structure. As a result, while the melamine resin is excellent in curability, the crosslinking density of the formed coating film tends to increase, and coating film peeling may occur during heat treatment, depending on the blended amount. On the other hand, while the benzoguanamine resin has poor curability as compared to the melamine resin, the crosslinking density of the formed coating film is less likely to increase, so that it can be said that the benzoguanamine resin is more suitable than the melamine resin from the perspective of coating film peeling resistance. Therefore, in order to balance curability and coating film peeling resistance during heat treatment, a mixed amino resin in which the melamine resin and the benzoguanamine resin are used in combination and mixed in a predetermined ratio may be used. In this case, in the blended amount ratio (mass ratio) of the melamine resin and the benzoguanamine resin, the blended amount of the benzoguanamine resin is desirably higher, and specifically, the ratio of the melamine resin and the benzoguanamine resin is from 49:51 to 5:95, preferably from 40:60 to 5:95, more preferably from 35:65 to 10:90, and further preferably from 30:70 to 10:90.

The curing agent is desirably blended in a range of from 1 to 40 parts by mass, preferably from 1 to 30 parts by mass, and more preferably from 2 to 20 parts by mass, with respect to 100 parts by mass of the polyester resin.

In a case where the resol-type phenolic resin is used as the curing agent, it is preferably blended in a range of from 1 to 40 parts by mass, preferably from 2 to 30 parts by mass, more preferably from 2 to 25 parts by mass, further preferably from 2.5 to 20 parts by mass, and particularly preferably from 3 to 15 parts by mass, with respect to 100 parts by mass of the polyester resin as the main agent (solid content). On the other hand, in a case where the melamine resin is used as the curing agent, it is preferably blended in an amount of from 1 to 15 parts by mass, preferably 1 part by mass or greater and less than 10 parts by mass, more preferably from 1 to 5.5 parts by mass, and particularly preferably from 2 to 5 parts by mass, with respect to 100 parts by mass of the polyester resin. In a case where the benzoguanamine resin is used as the curing agent, it is preferably blended in an amount of from 4 to 40 parts by mass, preferably from 5 to 30 parts by mass, more preferably from 6 to 28 parts by mass, further preferably from 8 to 25 parts by mass, and particularly preferably from 8 to 24 parts by mass, with respect to 100 parts by mass of the polyester resin. In a case where the mixed amino resin of the melamine resin and the benzoguanamine resin described above is used as the curing agent, it is preferably blended in an amount of from 2 to 25 parts by mass, preferably from 2 to 20 parts by mass, more preferably from 2.5 to 15 parts by mass, and further preferably 3 parts by mass or greater and less than 10 parts by mass, with respect to 100 parts by mass of the polyester resin.

When the curing agent amount is less than the above range, sufficient curability cannot be achieved, the degree of curing of the coating film is reduced, and the heat resistance tends to decrease. Thus, in a case where the drawn/ironed can is molded at a high speed, temperature rising is more pronounced, so that the coating film may easily stick to a mold during molding. Especially on the can inner surface side, when the can body is removed from a punch after drawing and ironing molding, a phenomenon in which the can body sticks to the punch to make it difficult to separate the can body from the punch (poor stripping property) occurs. As a result, the can body may buckle or break, resulting in a decrease in productivity. On the other hand, on the can outer surface side, an external surface defect such as a coating film scratch may occur. In addition, the coating film may be whitened in a case where the can body is subjected to sterilization treatment such as retort treatment after being filled with the content, and the retort whitening resistance may decrease.

On the other hand, in a case where the amount of the curing agent is larger than the above range, depending on the curing agent to be used, the can forming processability of the coating film is reduced, so that metal exposure may occur during drawing and ironing, and the curing degree of the coating film becomes high, which may increase the residual stress after processing, whereby coating film peeling occurs during heat treatment, which may result in poor covering property of the coating film.

The coating composition for inner surface and the coating composition for outer surface used in the disclosure are preferably blended with a curing catalyst for the purpose of promoting the crosslinking reaction of the polyester resin and the curing agent.

As the curing catalyst, a known curing catalyst can be used, and for example, an organic sulfonic acid-based acid catalyst and a phosphoric acid-based acid catalyst such as p-toluenesulfonic acid, dodecylbenzenesulfonic acid, dinonyl naphthalene disulfonic acid, phosphoric acid, alkylphosphoric acid, or an amine-neutralized product thereof can be used. Among the curing catalysts described above, the organic sulfonic acid-based acid catalyst is preferably used, and particularly, dodecylbenzene sulfone or an amine-neutralized product thereof is suitable.

The amount of the curing catalyst is desirably in a range of from 0.01 to 3 parts by mass, preferably from 0.02 to 1.0 parts by mass, more preferably 0.02 parts by mass or greater and less than 0.5 parts by mass, further preferably 0.03 parts by mass or greater and less than 0.3 parts by mass, particularly preferably 0.04 parts by mass or greater and less than 0.2 parts by mass, as a solid content, with respect to 100 parts by mass of the solid content of the polyester resin. Furthermore, in a case where the amine neutralized product of the acid catalyst (for example, an amine neutralized product of dodecylbenzenesulfonic acid) is used as the curing catalyst, the content of the acid catalyst excluding the amine is only required to be within the above range. In a case where the content of the curing catalyst is smaller than the above range, there is a possibility that the effect of promoting the curing reaction is not sufficiently obtained, while in a case where the content of the curing catalyst is larger than the above range, a further effect is not expected, and the water resistance of the coating film may be reduced, resulting in deterioration of corrosion resistance, retort whitening resistance, and the like. Furthermore, the acid catalyst is localized to the surface of the metal substrate due to acid-base interaction, which may lead to a decrease in adhesion between the coating film and the metal substrate, so that issues such as peeling off of the coating film may occur when molding a can.

Coating Composition

The coating composition that forms the coating film of the coated metal sheet used in the disclosure contains at least the polyester resin described above as the main component, preferably further the curing agent described above, and more preferably further the curing catalyst described above. Note that, in the disclosure, a component having the largest content (mass ratio) is defined as the main component among solid components (non-volatile components excluding volatile materials such as water or solvent) that forms the coating film in the coating composition. Furthermore, in the coating composition used in the disclosure, among all resin components contained in the coating composition, the content of the polyester resin, preferably the non-crystalline polyester resin, which is the main agent, is preferably greater than 50 mass %, more preferably 60 mass % or greater, further preferably 70 mass % or greater, particularly preferably 80 mass % or greater.

In the disclosure, as the form (type) of the coating composition that can be used in forming the coating film, a solvent-type coating composition or an aqueous coating composition is preferable, and the solvent-type coating composition is more preferable from the perspective of a coating property and the like.

In a case where the coating composition is the solvent-type coating composition, the polyester resin, preferably the curing agent, which are described above, and an organic solvent as the solvent are contained. Note that the solvent-type coating composition in the disclosure is defined as a coating composition made into a coating material by dissolving or dispersing a main agent resin, a curing agent, and the like in a known organic solvent, in which a mass ratio occupied by the organic solvent in the coating composition is 40 mass % or greater.

Examples of the organic solvent include toluene, xylene, aromatic hydrocarbon compounds, ethyl acetate, butyl acetate, methyl ethyl ketone, methyl isobutyl ketone, cyclohexanone, isophoron, methyl cellosolve, butyl cellosolve, ethylene glycol monoethyl ether acetate, diethylene glycol monoethyl ether acetate, ethylene glycol monoacetate, methanol, ethanol, butanol, ethylene glycol monoethyl ether, ethylene glycol monobutyl ether, diethylene glycol monobutyl ether, solvent naphtha, and the like. From these, one, or two or more are selected and used in consideration of solubility, evaporation rate, and the like.

In a case where the coating composition is the aqueous coating composition, an aqueous medium as a solvent is contained together with a known water-dispersible or water-soluble polyester resin and preferably a curing agent. Note that the aqueous coating composition according to the disclosure is defined as a coating composition made into a coating material by dissolving or dispersing a main agent resin, a curing agent, and the like in a known aqueous medium, in which a mass ratio occupied by the aqueous medium in the coating composition is 40 mass % or greater.

As the aqueous medium, similarly to the known aqueous coating composition, water, or a medium obtained by mixing water and an organic solvent such as an alcohol or a polyhydric alcohol, a derivative thereof, or the like can be used as the aqueous medium. In a case where the organic solvent is used, it is preferably contained in an amount of from 1 mass % or greater and less than 40 mass %, and particularly preferably in an amount of from 5 to 30 mass %, with respect to the entire aqueous medium in the aqueous coating composition. The composition containing an organic solvent in the above range improves film-forming performance.

Such an organic solvent preferably has amphiphilicity, and examples thereof include methyl alcohol, ethyl alcohol, isopropyl alcohol, n-butanol, ethylene glycol, methyl ethyl ketone, butyl cellosolve, carbitol, butyl carbitol, propylene glycol monopropyl ether, propylene glycol ethylene glycol monobutyl ether, propylene glycol monomethyl ether, propylene glycol monobutyl ether, dipropylene glycol monomethyl ether, dipropylene glycol monobutyl ether, tripropylene glycol monomethyl ether, and 3-methyl-3-methoxybutanol.

Lubricant

The coating composition may contain a lubricant, as necessary. In this case, preferably, the blended amount of the lubricant is in a range of from 0.1 parts by mass to 20 parts by mass, preferably from 0.2 to 10 parts by mass, and more preferably from 0.5 to 5 parts by mass, with respect to 100 parts by mass of the polyester resin.

By adding the lubricant, scratches on the coating film during molding processing can be suppressed, and smoothness of the coating film during molding processing can be improved.

Examples of the lubricant that can be added to the coating composition include a fatty acid ester wax that is an esterified product of a polyol compound and a fatty acid, a silicon-based wax, a fluorine-based wax such as polytetrafluoroethylene, a polyolefin wax such as polyethylene, a paraffin wax, lanolin, a montan wax, a microcrystalline wax, a carnauba wax, a silicon-based compound, white vaseline, and the like. One, or two or more of these lubricants can be mixed and used.

Others

To the coating composition, in addition to the above components, a leveling agent, a pigment, a defoaming agent, a coloring agent, and the like, which are blended in a coating composition in the related art, can be added in a known manner.

Further, in a range that does not impair the object of the disclosure, other resin components may be included together with the polyester resin, and for example, a resin such as polyvinyl acetate, ethylene-vinyl acetate copolymer, a polyolefin-based resin, an epoxy resin, a polyurethane resin, an acrylic resin, a polyvinyl chloride-based resin, a polyvinyl chloride-polyvinyl acetate copolymer resin, polyvinyl alcohol, an ethylene-vinyl alcohol copolymer, polyvinyl pyrrolidone, polyvinyl ethyl ether, polyacrylamide, an acrylamide-based compound, polyethylenimine, starch, gum arabic, methylcellulose, or the like may be included.

In the coating composition, preferably, solid components forming the coating film are contained in an amount of from 3 to 55 mass %, and preferably from 5 to 45 mass %, and preferably, the polyester resin is contained, as a solid content, in an amount of from 3 to 50 mass %, and preferably from 5 to 40 mass %. In a case where the amount of the solid components is smaller than the above range, an appropriate coating film amount cannot be ensured, leading to poor covering property. On the other hand, in a case where the amount of the resin solid content is larger than the above range, workability and coatability may be deteriorated.

Method for Producing Coated Metal Sheet

As described above, the coated metal sheet used in the disclosure is produced by applying the coating composition for inner surface containing the polyester resin as the main component and preferably the resol-type phenolic resin and/or amino resin as the curing agent, more preferably the resol-type phenolic resin, onto at least a surface of a metal sheet to be an inner surface. Preferably, onto a surface of the metal sheet to be an outer surface, the coating composition for outer surface containing the polyester resin as the main component and preferably the amino resin as the curing agent, as described above, is further applied.

Baking conditions of the coating composition are appropriately adjusted depending on the types, applied amounts, and the like of the polyester resin, the curing agent, and the metal substrate, and the coating composition described above is preferably heat-cured under conditions of a baking temperature of from 150° C. to 350° C., preferably higher than 200° C. and 320° C. or lower, for 5 seconds or longer, preferably from 5 seconds to 30 minutes, particularly preferably from 5 seconds to 180 seconds, in order to achieve a sufficient degree of curing. In a case where the baking temperature is lower than the above range, the sufficient degree of curing may not be achieved. On the other hand, in a case where the baking temperature is higher than the above range, excessive heating may cause the polyester resin to thermally decompose. In a case where the baking time is shorter than the above range, the sufficient degree of curing may not be achieved, and in a case where the baking time is longer than the above range, economic efficiency and productivity are deteriorated.

Furthermore, in the inner surface coating film and/or the outer surface coating film on the coated metal sheet after baking, preferably, a MEK extraction rate (MEK boiling point, 1 hour), which is an index of degree of curing, is in a range of 50% or less, preferably from 1 to 40%, more preferably from 2 to 30%, further preferably from 3 to 25%, and particularly preferably from 3 to 20%, and when the MEK extraction rate is in the above range, the degree of curing of the coating film is controlled, which is preferred from the perspective of heat resistance, corrosion resistance, retort whitening resistance, and coating film peeling resistance.

In a case where the MEK extraction rate is higher than the above range, the degree of curing of the coating film tends to decrease, the heat resistance tends to decrease, and thus in a case where the drawn/ironed can is molded at a high speed, temperature is pronouncedly raised, so that the coating film may be likely to stick to the mold during molding. Especially on the can inner surface side, when the can body is removed from a punch after drawing and ironing molding, a phenomenon in which the can body sticks to the punch to make it difficult to separate the can body from the punch (poor stripping property) occurs. As a result, the can body may buckle or break, resulting in a decrease in productivity and poor retort whitening resistance. On the can outer surface side, an external surface defect such as coating film scratches may occur, and the retort whitening resistance may be deteriorated.

On the other hand, in a case where the MEK extraction rate is lower than 1%, the degree of curing of the coating film is high, the residual stress during molding increases, and thus, coating film peeling may occur during heat treatment.

The coated metal sheet can can be manufactured as follows: coating is performed by a known coating method such as roll coater coating, spray coating, or dip coating as the coating method on at least a surface of the metal sheet to be on the can inner surface side, preferably on both surfaces, and then baking is performed by a heating means such as a coil oven.

Examples of a metal sheet used as the metal substrate of the coated metal sheet include, but not limited to, a hot-rolled steel sheet, a cold-rolled steel sheet, a molten galvanized steel sheet, an electrogalvanized steel sheet, an alloy plated steel sheet, an aluminum-zinc alloy plated steel sheet, an aluminum sheet, a tin plated steel sheet, a stainless steel sheet, a copper sheet, a copper plated steel sheet, a tin-free steel, a nickel plated steel sheet, an ultra-thin tin plated steel sheet, and a chromized steel sheet, and one obtained by subjecting these sheets to various types of surface treatment, for example, phosphoric acid chromate treatment or zirconium-based chemical conversion treatment, application-type treatment in which a water-soluble resin such as polyacrylic acid and a zirconium salt such as aluminum-zirconium carbonate are combined, or the like as necessary can be used.

In the disclosure, among the above metal sheets, the aluminum sheet, specifically, an aluminum alloy sheet of 3000 series, 5000 series, or 6000 series in "JIS H4000" can be preferably used. As the aluminum alloy sheet, in addition to the surface-treated aluminum alloy sheet that has been subjected to the various types of surface treatment described above, an untreated aluminum alloy sheet that has not been subjected to surface treatment can also be preferably used.

The thickness of the metal sheet is in a range of from 0.1 to 1.00 mm, preferably from 0.15 to 0.40 mm, more preferably from 0.15 to 0.30 mm, and further preferably from 0.20 to 0.28 mm, from the perspective of can body strength and moldability.

In the coated metal sheet of the disclosure, on the inner surface coating film formed on the surface to be on the can inner surface side after drawing and ironing, and/or the outer surface coating film formed on the surface to be on the can outer surface side after drawing and ironing, a coating film made of another coating composition (solvent-type coating composition or aqueous coating composition) may be formed as necessary, but is not preferably formed from the perspective of economic efficiency.

The outermost layer of a surface of the coated metal sheet used in the disclosure, the surface to be on the can inner surface side, is desirably the coating film formed of the coating composition, preferably the inner surface coating film made of the coating composition for inner surface described above, or a layer made of a wax-based lubricant described below formed on the inner surface coating film. Similarly, the outermost layer of a surface of the coated metal sheet used in the disclosure, the surface to be the can outer surface side, is desirably the coating film formed of the coating composition, preferably the outer surface coating film made of the coating composition for outer surface described above, or a layer made of the wax-based lubricant described below formed on the outer surface coating film.

Furthermore, in the coated metal sheet of the disclosure, the inner surface coating film and the outer surface coating film made of the above-described coating composition have excellent adhesion to the metal substrate, and thus, it is suitable that the inner surface coating film and/or the outer surface coating film is formed in such a manner to directly come into contact with the metal sheet, which is the metal substrate.

Method for Producing Drawn/Ironed Can

The method for producing a drawn/ironed can according to the disclosure has important characteristics that a coated metal sheet having, at least on a surface to be a can inner surface, an inner surface coating film containing a polyester resin having a glass transition temperature (Tg) of 55° C. or higher as a main component is used, an ironing rate in ironing is 40% or higher, drawing and ironing are performed at a processing speed of 2000 mm/sec or higher.

As described above, the present inventors have found that the coated metal sheet having an inner surface coating film containing a polyester with a high glass transition temperature is used in order to improve the flavor sorption resistance, and even in a case where severe processing having the ironing rate of 40% or higher is performed, performing drawing and ironing at a molding speed (processing speed) of 2000 mm/sec or higher improves the can forming processability, and can effectively suppress occurrence of coating film peeling during heat treatment.

That is, it is considered that in ironing at a high speed of 2000 mm/sec or higher, large processing heat is generated, and molding is performed at a temperature exceeding the glass transition temperature of the polyester resin, so that the elongation of the coating film is improved to improve the can forming processability. In addition, residual stress in the coating film after molding is reduced, and thus, it is possible to suppress coating film peeling during heat treatment. As a result, metal exposure of the inner surface is prevented, and it is possible to provide a drawn/ironed can having a high coating film covering property of the inner surface. Furthermore, in a case where a double-sided coated metal sheet also having the outer surface coating film on the surface to be the can outer surface after drawing and ironing described above is used, it is possible to provide a drawn/ironed can also having an excellent coating film covering property of the outer surface.

In the production method of the disclosure, as described above, it is possible to improve the elongation of the coating film of the coated metal sheet and the can forming processability by drawing and ironing at a high processing speed, and thus, even during severe drawing and ironing, it is possible to mold a drawn/ironed can without causing a coating film defect or trunk breakage during processing, or coating film peeling at an end of the can opening. Note that the coated metal sheet preferably used in the disclosure has excellent moldability and lubrication property, and thus it is possible to mold the drawn/ironed can not only in a case of using coolant, but also in a case of performing molding under a dry condition without using coolant.

It is preferable to apply a wax-based lubricant onto the surface of the coated metal sheet prior to drawing and ironing, whereby drawing and ironing can be efficiently performed under the dry condition. Examples of the wax-based lubricant include, but not limited to, a fatty acid ester wax, a silicon-based wax, white vaseline, a rice wax, beeswax, a Japanese wax, a mineral-derived wax such as a montan wax, a Fischer-Tropsch wax, a polyolefin wax such as polyethylene or polypropylene, a paraffin-based wax, fluid paraffin, a lanolin wax, a microcrystalline wax, a carnauba wax, and the like, and the paraffin-based wax and the white vaseline can be more preferably used. Among the wax-based lubricants, a wax-based lubricant that has no issue particularly on food sanitation and can be easily volatilized and removed by heating at a temperature of from 150 to 250° C., preferably approximately 200° C., is desirable, and thus the wax-based lubricant can be volatilized and removed by heat treatment in a post-process after molding the drawn/ironed can, so that in a case where the can trunk is subjected to outer surface printing, ink is unlikely to be repelled by the wax-based lubricant, which is convenient. One, or two or more of these wax-based lubricants can be mixed and used. Desirably, a coating amount of the wax-based lubricant is in a range of from 5 to 200 mg/m$^2$, preferably from 10 to 100 mg/m$^2$, and more preferably from 20 to 80 mg/m$^2$, per surface of the coated metal sheet from the perspective of moldability and productivity. In the coated metal sheet on which the wax-based lubricant has been applied, a blank is punched by a cupping press, and a drawn cup is molded by a drawing method. In the disclosure, it is desirable that a drawn ratio RD defined by the following formula (3) is in a range of from 1.1 to 2.6, particularly in a range of from 1.4 to 2.6, in total (to the drawn/ironed can). When the drawn ratio is larger than the above range, drawn wrinkles may increase, and cracks may occur in the coating film to cause metal exposure.

$$RD=D/d \quad (3)$$

where D represents a blank diameter and d represents a can trunk diameter.

Next, the drawn cup is subjected to re-drawing, that is, ironing in a single stage or several stages (drawing and ironing) to thin the can trunk portion. In this case, in the disclosure, it is desirable to use a punch that is adjusted at a temperature of from 10 to 80° C., preferably from 15 to 70° C., more preferably from 20 to 60° C., and further preferably from 20 to 50° C., as the punch used for molding. Note that, as a method of temperature adjustment, for example, a method of circulating temperature-controlled water inside the punch, or the like is exemplified. When the punch temperature is lower than the above range, the wax-based lubricant applied onto the coated metal sheet cannot exhibit sufficient slidability, and at the time of removing the can body from the punch, a poor stripping property (removability) may occur, and the coating film covering property after molding may be reduced. On the other hand, when the punch temperature is higher than the above range, at the time of removing the can body from the punch, the coating film is likely to stick, so that a poor stripping property may occur. Furthermore, as a die, it is desirable to use a die that has been adjusted at a temperature of from 10 to 80° C., preferably from 15 to 70° C., from the perspective of stable and continuous molding.

In the disclosure, desirably, an ironed rate R represented by the following formula (4) is in a range of 40% or higher, preferably from 40 to 80%, more preferably from 50 to 80%, further preferably higher than 55% and 75% or less, and particularly preferably higher than 60% and 70% or less. When the ironed rate is lower than the above range, it is not possible to achieve sufficient thinning, and thus economic efficiency is insufficient. On the other hand, in a case where the ironed ratio is higher than the above range, there is a risk of metal exposure.

$$R(\%)=(tp-tw)/tp\times 100 \quad (4)$$

where tp represents a thickness of the metal substrate of the original coated metal sheet, and tw represents a thickness of the metal substrate in the central portion (thinnest portion) of the can trunk of the drawn/ironed can.

In the drawn/ironed can obtained by the method for producing a drawn/ironed can according to the disclosure, preferably, the thickness of the central portion of the can trunk (central portion in the height direction, the thinnest portion) is 60% or less, preferably from 20 to 60%, more preferably from 20 to 50%, further preferably from 25 to 45%, particularly preferably from 30 to 45%, and most preferably from 30% to 40%, of the thickness of the central portion of the can bottom. Similarly, for the thickness of the metal substrate of the drawn/ironed can, preferably, the thickness of the metal substrate in the central portion of the can trunk is 60% or less, preferably from 20 to 60%, more preferably from 20 to 50%, further preferably from 25 to 45%, particularly preferably from 30 to 45%, and most preferably from 30% to 40%, of the thickness of the metal substrate in the central portion of the can bottom. In addition, in a case where the drawn/ironed can is molded from the coated metal sheet by drawing and ironing, the thickness of the inner surface coating film located in the can trunk portion is thinned in the same manner as the metal substrate by the processing. Accordingly, preferably, the thicknesses of the inner surface coating film and the outer surface coating film in the central portion of the can trunk are 60% or less, preferably from 20 to 60%, more preferably from 20 to 50%, further preferably from 25 to 45%, particularly preferably 30 to 45%, and most preferably 30% to 40%, of the thickness of the inner surface coating film in the central portion of the can bottom, which is hardly thinned during can forming. The same applies to the outer surface coating film.

Preferably, the thickness of the metal substrate in the central portion of the can bottom is from 0.10 to 0.50 mm, preferably from 0.15 to 0.40 mm, more preferably from 0.15 to 0.30 mm, and further preferably from 0.20 to 0.28 mm.

Furthermore, preferably, the film thickness of the inner surface coating film in the central portion of the can bottom is in a range of from 0.2 to 20 μ, preferably from 1 to 12 μm, and more preferably larger than 2 μm and 12 μm or less, as dry film thickness. In addition, preferably, the dry coating film mass is in a range of from 3 to 300 mg/dm$^2$, preferably from 15 to 150 mg/dm$^2$, and more preferably greater than 25 mg/dm$^2$ and 150 mg/dm$^2$ or less. Furthermore, in a case where a content to be filled into the drawn/ironed can is an acidic beverage having a strong corrosion property, preferably, the film thickness is in a range of greater than 6 μm and 12 μm or less, and preferably from 6.5 to 10 μm. In addition, preferably, the dry coating film mass is in a range of greater than 85 mg/dm$^2$ and 150 mg/dm$^2$ or less, and preferably from 90 to 140 mg/dm$^2$. In a case where a content to be filled into the drawn/ironed can is a low acidic beverage or the like having a relatively weak corrosion property, the film thickness is in a range of 1 μm or greater and less than 6.5 μm, preferably greater than 2 μm and less than 6.5 μm, and more preferably from 2.5 μm to 6 μm. Furthermore, preferably, the dry coating film mass is in a range of 15 mg/dm$^2$ or greater and less than 90 mg/dm$^2$, preferably greater than 25 mg/dm$^2$ and less than 90 mg/dm$^2$, and more preferably from 30 to 85 mg/dm$^2$.

Preferably, the film thickness of the outer surface coating film in the central portion of the can bottom is in a range of from 0.2 to 20 μm, preferably from 1 to 12 μm, more preferably greater than 2 μm and 10 μm or less, and further preferably greater than 2 μm and 6.5 μm or less, as dry film thickness. In addition, preferably, the dry coating film mass is in a range of from 3 to 300 mg/dm$^2$, preferably from 15 to 150 mg/dm$^2$, more preferably greater than 25 and 140 mg/dm$^2$ or less, and further preferably greater than 25 mg/dm$^2$ and less than 90 mg/dm$^2$.

In addition, in a case where the drawn/ironed can is molded from the coated metal sheet having the inner surface coating film by drawing and ironing as described above, the thickness of the inner surface coating film located in the can trunk portion is thinned by the processing in the same manner as the metal substrate located in the can trunk portion. Accordingly, in the drawn/ironed can of the disclosure, the thickness ratio of the inner surface coating film to the metal substrate in the can trunk portion and the thickness ratio of the inner surface coating film and the metal substrate in the can bottom portion are substantially the same. That is, in the drawn/ironed can of the disclosure, the thickness ratio of the inner surface coating film and the metal substrate (=thickness of the inner surface coating film/thickness of the metal substrate) is substantially the same in the can bottom portion and the can trunk portion. Note that "substantially the same" here means that the production error is included in the range, and for example, it means that (thickness of the inner surface coating film/thickness of the metal substrate) of the can trunk portion is in a range of from 0.9 to 1.1 times (thickness of the inner surface coating film/thickness of the metal substrate) of the can bottom portion. Note that the same applies to the outer surface coating film.

Furthermore, in the drawn/ironed can of the disclosure, the thickness ratio of the inner surface coating film and the metal substrate in the can trunk portion (=thickness of the inner surface coating film/thickness of the metal substrate) is substantially identical in the entire can trunk portion regardless of a position in the can trunk portion. Note that the same applies to the outer surface coating film.

The processing speed in the disclosure is a processing speed of ironing in the single or several stages (moving speed of the punch mold), and as described above, is 2000 mm/sec or higher, preferably 3000 mm/sec or higher, more preferably 4000 mm/sec or higher, further preferably 5000 mm/sec or higher, and particularly preferably 5500 mm/sec or higher. As described above, by setting the processing speed of ironing to the above speed or higher, processing heat generation becomes large, leading to a high temperature state exceeding 55° C., which improves processability (elongation) of the coating film. As a result, also in a case where polyester having a high glass transition temperature is used, metal exposure during molding is suppressed, and the covering property of the inner surface coating film and the outer surface coating film after molding can be further improved. Furthermore, by molding at a high temperature higher than the glass transition temperature of the polyester resin, stress relaxation is likely to occur during molding, and thus the residual stress in the coating film after molding can be reduced, which makes it possible to suppress coating film peeling during heat treatment. Note that the upper limit of the processing speed is not particularly limited, but is desirably, for example, 20000 mm/sec or less, and preferably 15000 mm/sec or less. It is inferred that when exceeding 20000 mm/sec, trunk breakage is likely to occur during processing.

After drawing and ironing, doming molding of the bottom portion and trimming of the opening end edge are performed according to a common method as desired.

According to the method for producing a drawn/ironed can of the disclosure, after the coated metal sheet is subjected to drawing and ironing, the obtained drawn/ironed can is desirably subjected to a heat treatment process. The residual stress in the coating film generated by the processing can be removed by subjecting the drawn/ironed can after molding to heat treatment at least in the single stage. By removing the residual stress in the coating film, it is possible to improve the adhesion between the coating film and the metal substrate (coating film adhesion) after the processing. As a result, the corrosion resistance of the coating film is significantly improved, so that occurrence of corrosion under the coating film can be suppressed, for example, when the drawn/ironed can is filled with a content having a strong corrosive property. The temperature of the heat treatment needs to be higher than the glass transition temperature of the coating film, and is desirably in a temperature range of 55° C. or higher, preferably from 100 to 300° C., and more preferably from 150 to 250° C. The period of time of the heat treatment is not limited to this, but preferably, heating is performed for from 0.1 to 600 seconds, preferably from 1 to 300 seconds, and more preferably from 20 to 180 seconds. Note that in the heat treatment process, the above-described wax-based lubricant used during processing can be volatilized and removed from the surface. In this case, the temperature of the heat treatment is desirably in a temperature range of from 150 to 250° C., and the period of time of the heat treatment is not limited to this, but preferably, heating is performed for from 0.1 to 600 seconds, preferably from 1 to 300 seconds, more preferably from 10 to 180 seconds.

In a case where the residual stress in the coating film of the drawn/ironed can is not removed by heat treatment, when the coating film of the central portion of the can trunk (central portion in the height direction) where a degree of processing is large is isolated from the metal substrate and heated, its dimension largely changes in a direction in which the residual stress is released (mainly in a can height direction), and thus, by measuring a dimension change amount of the isolated coating film due to heating (heat shrinkage rate), it is possible to provide a rough indication of whether the residual stress is removed by heat treatment.

Desirably, the heat shrinkage rate (with load) represented by the following formula (5) in the inner coating film of the central portion of the can trunk isolated from the drawn/ironed can is 30% or less, preferably 20% or less, more preferably 15% or less, and further preferably 10% or less. Furthermore, desirably, the heat shrinkage rate (without load) represented by the following formula (6) is 50% or less, preferably 45% or less, more preferably 40% or less, and further preferably 35% or less. In a case where the heat shrinkage rate is within the range described above, the coating film adhesion is improved, so that excellent corrosion resistance can be exhibited. In a case where the heat shrinkage rate is larger than the range described above, the residual stress is not sufficiently removed, corrosion resistance may be reduced due to insufficient coating film adhesion, and the coating film may be peeled off when the can is subjected to an impact and get dented. In addition, in a case where the outer surface coating film is provided on the can outer surface side, the heat shrinkage rate is also desirably within the range described above in the outer surface coating film of the central portion of the can trunk.

Note that the amount of change in dimension (shrinkage amount) of the isolated coating film due to heating can be measured by a thermomechanical analyzer (TMA) or the like.

$$\text{Heat shrinkage rate (with load)}=(\Delta L_1/L_0)\times100(\%) \quad (5)$$

In the formula, $L_0$ is an initial length (measurement portion) of the coating film isolated from the central portion of the can trunk in the height direction, and $\Delta L_1$ is the maximum shrinkage amount (maximum value of the shrinkage length) of the coating film of the portion corresponding to $L_0$ in the height direction when the temperature is raised from 30° C. to 200° C. at a temperature increase rate of 5° C./min while applying a load of $5.20\times10^5$ N/$m^2$ per unit area.

$$\text{Heat shrinkage rate (without load)}=(\Delta L_2/L_0)\times100(\%) \quad (6)$$

where $L_0$ is the initial length of the coating film isolated from the central portion of the can trunk in the height direction, $\Delta L_2$ is the maximum shrinkage amount (maximum value of the shrinkage length) of the coating film of the portion corresponding to $L_0$ in the height direction when the temperature is raised from 30° C. to 200° C. at the temperature raising rate of 5° C./min in an unloaded state.

After heat treatment, after quenching or cooling, furthermore, as needed, a printed layer is formed on the outer surface in the can trunk portion in a printing process by a known method, and a finishing varnish layer for protecting the printed layer is formed on the printed layer. As desired, single stage or multi-stage neck-in processing is performed, and flange processing is performed to form a can for seaming. Alternatively, after the drawn/ironed can is molded, the upper portion thereof can be deformed to form a bottle shape, or the bottom portion thereof can be cut out and another can end can be attached thereto to form a bottle shape.

Preferably, a capacity of the drawn/ironed can is from 150 mL or greater, preferably from 150 to 2200 mL, more preferably from 180 to 1200 mL, and further preferably from 300 to 700 mL.

In addition, according to the method for producing a drawn/ironed can of the disclosure, as described above, neither metal exposure during molding processing nor coating film peeling during heat treatment occurs, and thus, it is possible to obtain the drawn/ironed can having an excellent coating film covering property in which the inner surface coating film has a degree of coverage of 200 mA or less in terms of an enamel rater value (ERV). Here, the degree of coverage of the inner surface coating film obtained in terms of ERV is a value obtained by filling the obtained drawn/ironed can with salt solution of a concentration of 1 mass %, which is an electrolytic solution, to the vicinity of the can opening and measuring ERV by an enamel rater, and is defined as a current value after connecting an anode electrode to a metal exposure portion formed on the outer surface side of the can bottom while immersing a cathode electrode in the salt solution filled in the can, and applying a direct voltage of 6.3 V for 4 seconds at room temperature (approximately 20° C.). In such a measurement, larger current flowing indicates that there is a defect in the inner surface coating film, which is an insulator, and that an area of metal exposure on the can inner surface is larger.

Desirably, the degree of coverage of the inner surface coating film in terms of ERV is 200 mA or less, preferably less than 100 mA, and more preferably less than 50 mA. In a case of expressing the degree of coverage in ERV per unit area ($cm^2$), desirably, it is 0.70 mA/$cm^2$ or less, preferably less than 0.35 mA/$cm^2$, and more preferably less than 0.18 mA/$cm^2$. Here, the ERV per unit area is a value obtained by dividing the ERV of the drawn/ironed can measured by the method described above by an evaluation area (a total area of the inner surface portions of the can trunk portion and the can bottom portion that are in contact with the above-described salt solution).

Note that on the inner surface side of the drawn/ironed can, after molding, the inner surface may be further subjected to spray-coating of a correction coating material or the like to form a coating film made of another coating composition on the inner surface coating film as necessary, but as described above, the inner surface coating film has a high degree of coverage even after molding, so that it is not necessary to perform spray-coating, and preferably, spray-coating is not performed from the perspective of economic efficiency. In other words, the outermost layer on the inner surface side of the drawn/ironed can is preferably the coating film made of the coating composition, preferably, the inner surface coating film made of the coating composition for inner surface described above, or a layer made of the above-described wax-based lubricant formed on the inner surface coating film.

On the other hand, on the can outer surface side, the outermost layer of at least the bottom portion where the printed layer is not basically formed is preferably the outer surface coating film, or a layer made of the above-described wax-based lubricant formed on the outer surface coating film, but for the purpose of improving transportability of the can body or the like, a coating film made of another coating composition may be further formed on the outer surface coating film formed on the outer surface side of the bottom portion.

Drawn/Ironed Can

The drawn/ironed can of the disclosure is a drawn/ironed can molded from the coated metal sheet described above by the above-described method for producing a drawn/ironed can and having an inner surface coating film at least on a can inner surface side, and has important characteristics that the inner surface coating film contains a polyester resin as a main component and preferably further a curing agent, a glass transition temperature (Tg) of the inner surface coating film is 55° C. or higher, and a degree of coverage of the inner surface coating film is 200 mA or less in terms of ERV.

In other words, the drawn/ironed can of the disclosure has the glass transition temperature of the polyester resin contained in the inner surface coating film of 55° C. or higher, which is high, and thus the flavor sorption resistance is excellent. Furthermore, by performing ironing at a high speed, the processing heat becomes large to significantly improve the can forming processability, and thus, even in a case where a polyester resin having a high glass transition temperature of 55° C. or higher is used, metal exposure during molding can be suppressed to improve the coating film covering property of the inner surface. Furthermore, large processing heat can reduce residual stress in the coating film after processing, and thus occurrence of coating film peeling during heat treatment as described above is effectively suppressed. As a result, in the obtained drawn/ironed can, metal exposure is effectively prevented, and the degree of coverage of the inner surface coating film expressed in terms of ERV can be 200 mA or less, which makes it possible to exhibit excellent corrosion resistance.

Furthermore, preferably, the drawn/ironed can further includes an outer surface coating film on the can outer surface side, and the outer surface coating film contains a polyester resin, and preferably further a curing agent.

In addition, it is preferable that in the drawn/ironed can, at least the can bottom portion and the can trunk portion on the can inner surface side are continuously covered with the inner surface coating film, and further, it is preferable that the can bottom portion and the can trunk portion on the can outer surface side are continuously covered with the outer surface coating film.

Furthermore, the drawn/ironed can of the disclosure desirably has an elongation percentage of the inner surface coating film of less than 200% under a test condition of 60° C. in the can bottom portion. As described above, in the method for producing a drawn/ironed can of the disclosure, it is desirable to use a coated metal sheet having an inner surface coating film with an elongation percentage of less than 200% under a test condition of 60° C., from the perspective of flavor sorption resistance. In a case where a coated metal sheet having an inner surface coating film with an elongation percentage of less than 200% under a test condition of 60° C. is used, the can bottom portion of the drawn/ironed can is rarely thinned during can forming, and exhibits an elongation percentage the same as that of the inner surface coating film of the coated metal sheet, so that the elongation percentage of the inner surface coating film in the can bottom portion is less than 200%.

EXAMPLES

Hereinafter, the disclosure will be specifically described using Examples and Comparative Examples. Note that simple "parts" indicate "parts by mass".

Various measurement items of polyester resins A to F were according to the following methods. Note that all the polyester resins A, C, D, E, and F are non-crystalline polyester resins.

Measurement of Number Average Molecular Weight

The number average molecular weight was measured by using a calibration curve of standard polystyrene with gel permeation chromatography (GPC).

Measurement of Glass Transition Temperature

The glass transition temperature was measured by using a differential scanning calorimeter (DSC) at a temperature raising rate of 10° C./min.

Measurement of Acid Value

One g of a solid product of a polyester resin was dissolved in 10 ml of chloroform and titrated with 0.1 N KOH ethanol solution to determine the acid value of the resin (mg KOH/g). As an indicator, phenolphthalein was used.

Measurement of Monomer Composition

Thirty mg of a solid product of a polyester resin was dissolved in 0.6 mL of deuterated chloroform and 1H-NMR measurement was performed to determine a monomer composition ratio from peak intensities. A composition ratio was determined by removing components of small quantities (less than 1 mol % with respect to the total monomer components).

Preparation of Coating Composition for Inner Surface

Production Example 1

The polyester resin A (acid value: 2 mg KOH/g, hydroxyl value: 5 mg KOH/g, Tg: 75° C., Mn=18000, monomer composition: terephthalic acid component/isophthalic acid component/ethylene glycol component/propylene glycol component=38/12/17/33 mol %) as the polyester resin, the resol-type phenolic resin as the curing agent, and dodecylbenzene sulfonic acid (amine-neutralized product) as the curing catalyst (acid catalyst) were used.

The polyester resin A was dissolved in a mixed solvent of methyl ethyl ketone/solvent naphtha=50/50 (mass ratio) to obtain a polyester resin A solution with a solid content of 30 mass %. An n-butanol solution of the resol-type phenolic resin (solid content of 50 mass %) was diluted with methyl ethyl ketone to obtain a resol-type phenolic resin solution with a solid content of 30 mass %. After the dodecylbenzenesulfonic acid was amine-neutralized with 2-dimethylaminoethanol, the resulting neutralized product was dissolved in isopropanol to obtain a dodecylbenzenesulfonic acid solution with a solid content of 30 mass % (solid content of acid catalyst of 30 mass %).

Next, 333 parts of the polyester resin A solution (solid content of 100 parts), 33.3 parts of the resol-type phenolic resin solution (solid content of 10 parts), and 0.33 parts of the acid catalyst solution (solid content of the dodecylbenzenesulfonic acid of 0.10 parts) were placed in a glass container and stirred for 10 minutes to prepare a solvent-type coating composition having a solid content concentration of approximately 30 mass % and a solid content blending ratio of polyester resin/curing agent/acid catalyst=100/10/0.1 (mass ratio). Note that an m-cresol-based resol-type phenolic resin obtained by alkyl-etherifying methylol groups with n-butanol (proportion of alkyl-etherified methylol groups: 90 mol %, Mn=1,200) as the resol-type phenolic resin and "dodecylbenzene sulfonic acid (soft type) (mixture)" available from Tokyo Chemical Industry Co., Ltd. as the acid catalyst were used.

Production Example 2

A coating composition for inner surface was prepared in the same manner as Production Example 1, except that as the polyester resin, a mixture obtained by mixing the polyester resin A and the polyester resin B (Tg: −25° C., Mn=17000, acid value: 11 mg KOH/g, monomer composition: terephthalic acid component/isophthalic acid component/sebacic acid component/1,4-butanediol component=14/17/19/50 mol %) in a solid content mass ratio of 94:6 ($Tg_{mix}$: 67° C.) was used.

Production Example 3

A coating composition for inner surface was prepared in the same manner as in Production Example 2 except that the solid content blending ratio (mass ratio) of the polyester resins was as shown in Table 1.

Production Examples 4 and 5

Coating compositions for inner surface were prepared in the same manner as in Production Example 1 except that types of the polyester resin were changed as shown in Table 1. As the polyester resin, the polyester resin C (acid value: 2 mg KOH/g, Tg: 85° C., Mn=18000, monomer composition: terephthalic acid component/ethylene glycol component/propylene glycol component=50/14/36 mol %), and the polyester resin D (acid value: 2 mg KOH/g, Tg: 65° C., Mn=20000, monomer composition: terephthalic acid component/isophthalic acid component/ethylene glycol component/neopentyl glycol component=25/25/23/27 mol %) were used, other than the polyester resin described above.

Production Example 6

A coating composition for inner surface was prepared in the same manner as in Production Example 1 except that a mixture ($Tg_{mix}$: 76° C.) obtained by mixing the polyester resin A and the polyester resin E (acid value: 22 mg KOH/g, Tg: 82° C., Mn=6000) in a mass ratio of 90:10 was used as the polyester resin.

Production Example 7

A coating composition for inner surface was prepared in the same manner as in Production Example 1 except that a mixture ($Tg_{mix}$: 76° C.) obtained by mixing the polyester resin A and the polyester resin E in a mass ratio of 90:10 as the polyester resin, and the benzoguanamine resin (methyl-etherified benzoguanamine resin, imino group/methylol group-containing partial etherification type, weight average polymerization degree of 1.5) as the curing agent were used to have the solid content blending ration (mass ratio) shown in Table 1.

Production Example 8

A coating composition for inner surface was prepared in the same manner as in Production Example 1 except that neither curing agent nor curing catalyst was blended.

Production Examples 9 and 10

A coating composition for inner surface was prepared in the same manner as in Production Example 2 except that the solid content blending ratio (mass ratio) of the polyester resins was as shown in Table 1.

Production Example 11

A coating composition for inner surface was prepared in the same manner as in Production Example 1 except that the polyester resin F (acid value: 3 mg KOH/g, Tg: 40° C., Mn=15000) was used as the polyester resin.

Preparation of Coating Composition for Outer Surface

The polyester resin A was used as the polyester resin, the melamine resin (methyl-etherified melamine resin) and the above-described benzoguanamine resin (methyl-etherified benzoguanamine resin) were used as the curing agent, and the dodecylbenzene sulfonic acid was used as the curing catalyst (acid catalyst).

The polyester resin A was dissolved in a mixed solvent of methyl ethyl ketone/solvent naphtha=50/50 (mass ratio) to obtain a polyester resin A solution with a solid content of 30 mass %. The melamine resin and the benzoguanamine resin were dissolved in methyl ethyl ketone to obtain a melamine resin solution and a benzoguanamine resin solution with a solid content of 30 mass %. After the dodecylbenzenesulfonic acid was amine-neutralized with 2-dimethylaminoethanol, the resulting neutralized product was dissolved in isopropanol to obtain a dodecylbenzenesulfonic acid solution with a solid content of the acid catalyst of 30 mass %.

Next, 333 parts of the polyester resin A solution (solid content of 100 parts), 10 parts of a melamine resin solution (solid content of 3 parts), 10 parts of the benzoguanamine resin solution (solid content of 3 parts), and 0.33 parts of the acid catalyst solution (solid content of the dodecylbenzenesulfonic acid of 0.10 parts) were used to prepare a coating composition [solid content concentration: approximately 30 mass %, solid content blending ratio: polyester resin/melamine resin/benzoguanamine resin/acid catalyst=100/3/3/0.1 (solid content mass ratio)].

Example 1

Production of Coated Metal Sheet

A phosphoric acid chromate-based surface treated aluminum sheet (3104 alloy, sheet thickness: 0.27 mm) was used as the metal sheet, a surface to be on the outer surface side after molding was first coated with the coating composition for outer surface by a bar coater in such a manner that a dry mass of the coating film after baking was 40 mg/dm$^2$ (approximately 3 μm), and drying was performed at 120° C. for 60 seconds. Thereafter, a surface to be on the inner surface side was coated with the coating composition for inner surface of Production Example 1 by a bar coater in such a manner that a dry mass of the coating film after baking was 88 mg/dm$^2$ (approximately 6.4 μm), drying was performed at 120° C. for 60 seconds, and then baking was performed at 250° C. (furnace internal temperature in the oven) for 30 seconds to produce a coated metal sheet.

Production of Drawn/Ironed Can

After a paraffin wax (that can be volatilized and removed by heating at approximately 200° C.) was applied (application amount: approximately 50 mg/m$^2$ per surface) to both sides of the coated metal sheet produced by the method described above, the resulting coated metal sheet was punched into a circle having a diameter of 142 mm to form a shallow drawn cup. Then, the shallow drawn cup was subjected to re-drawing, ironing (three stages), and doming under a dry condition, using a punch (punch temperature: approximately from 50 to 55° C.) with an outer diameter of Φ66 mm. An average processing speed during ironing (average moving speed of the punch during ironing) was set to approximately 5500 mm/sec. Note that the punch temperature is expressed by the temperature of temperature-controlled water inside the punch. Thereafter, an oven was used to perform heat treatment at 201° C. for 75 seconds to obtain a drawn/ironed can [can diameter: 66 mm, height: approximately 130 mm, capacity: approximately 370 ml, total drawn ratio: 2.15, ironed rate: approximately 61%, thickness of central portion of can trunk/thickness of central portion of can bottom×100=approximately 40%, thickness of metal substrate of central portion of can trunk/thickness of metal substrate of central portion of can bottom×100=approximately 40%, thickness of inner surface coating film of central portion of can trunk/thickness of inner surface coating film of central portion of can bottom×100=approximately 39%, mass (film thickness) of inner surface coating film of central portion of can bottom: 86 mg/dm$^2$ (approximately 6.3 μm), thickness of inner surface coating film of central portion of can bottom/thickness of metal substrate of central portion of can bottom=approximately 0.024, thickness of inner surface coating film of central portion of can trunk/thickness of metal substrate of central portion of can trunk=approximately 0.023].

Examples 2 to 8

Coated metal sheets were produced in the same manner as in Example 1 except that types of the coating compositions for inner surface were changed as shown in Table [2], and drawn/ironed cans were produced.

Example 9

A coated metal sheet was produced and a drawn/ironed can was produced in the same manner as in Example 1 except that the average processing speed (average moving speed of the punch) during ironing at the time of producing the drawn/ironed can was set to approximately 6800 mm/sec.

Comparative Example 1

A coated metal sheet was produced and a drawn/ironed can was produced in the same manner as in Example 1 except that the average processing speed (average moving speed of the punch) during ironing at the time of producing the drawn/ironed can was set to approximately 1000 mm/sec.

Comparative Examples 2 to 5

A coated metal sheet was produced and a drawn/ironed can was produced in the same manner as in Example 1 except that types of the coating compositions for inner surface were changed as shown in Table 2 and the average processing speed (average moving speed of the punch) during ironing was set to approximately 1000 mm/sec.

Comparative Examples 6 and 7

Coated metal sheets were produced in the same manner as in Example 1 except that types of the coating compositions for inner surface were changed as shown in Table 2, and drawn/ironed cans were produced.

For performances of the coating films obtained by the coating compositions for inner surface of Production Examples, and the drawn/ironed cans obtained by the method described above, tests were conducted according to the following test methods.

Glass Transition Temperature of Coating Film (Coating Film Tg)

A coating film sample for measurement was prepared as described below using the coating composition for inner surface in each of Production Examples. A polytetrafluoroethylene (PTFE) sheet (film thickness: 0.3 μm) was coated with the coating composition for inner surface of each of Production Examples by a bar coater in such a manner that a dry mass of the coating film after baking was 88 mg/dm$^2$ (approximately 6.4 μm), drying was performed at 120° C. for 60 seconds, and then baking was performed at 250° C. (furnace internal temperature in the oven) for 30 seconds to produce a coating film on the PTFE sheet. After cooling to room temperature, the coating film was peeled from the PTFE sheet to obtain a measurement sample. For the obtained coating film, the glass transition temperature of the coating film was measured using a differential scanning calorimeter (DSC) in the following conditions. Note that in 2nd-run (temperature raising), the temperature at the intersection of a straight line drawn by extending an extrapolated glass transition onset temperature, that is, baseline on the lower temperature side toward the high temperature side and a tangent line drawn at a point where a slope of a curve of a stepwise changing portion of glass transition was the maximum was defined as the glass transition temperature of the coating film (coating film Tg). The results are shown in Table 1.

Instrument: DSC6220, available from Seiko Instruments Inc.

Sample amount: 5 mg

Temperature raising rate: 10° C./min

Temperature range: from −80 to 200° C. (heating, cooling, heating)

Environmental condition: under nitrogen gas flow

Elongation Percentage of Coating Film

A coating film sample for measurement was prepared as described below using the coating composition for inner surface in each of Production Examples. A PTFE sheet (film thickness: 0.3 mm) was coated with the coating composition for inner surface of each of Production Examples by a bar coater in such a manner that a dry mass of the coating film after baking was 88 mg/dm$^2$ (approximately 6.4 μm), drying was performed at 120° C. for 60 seconds, and then baking was performed at 250° C. (furnace internal temperature in the oven) for 30 seconds to produce a coating film on the PTFE sheet. After cooling to room temperature, the PTFE sheet on which the coating film was formed was cut into a length of 30 mm with a width of 5 mm, and the coating film was peeled from the PTFE sheet to obtain a measurement sample having a length of 30 mm with a width of 5 mm. With an upper gripping margin of 5 mm and a lower gripping margin of 5 mm, the sample was chucked in a tensile tester, and an inter-chuck distance (original length of the sample) was set to 20 mm. A tensile test was performed under the following conditions, and an elongation percentage at break (elongation at break) of the coating film was measured. The results are shown in Table 1.

Instrument: Autograph AG-IS, available from Shimadzu Corporation

Measurement atmosphere temperature: 60° C.

Tensile rate: 500 mm/min

The elongation percentage is determined by the following formula (7). Note that an elongation amount (length of elongation) of the sample at break was substituted by a crosshead movement amount of the tester at break.

$$\text{Elongation percentage }(\%)=(\Delta L/L_0)\times 100 \quad (7)$$

$L_0$: original length of sample (mm)

$\Delta L$: elongation amount of sample at break (mm)

Note that in a case where the measurement sample is obtained from the coated metal sheet or the can bottom of the drawn/ironed can in which the coating film is formed on both sides, the coating film on one side that is not measured is removed by scraping with sandpaper or the like, and then the coated metal sheet or the can bottom is cut out into a length of 30 mm with a width of 5 mm, the metal substrate (metal sheet) is dissolved by a common method such as immersion in diluted hydrochloric acid aqueous solution to take out a film-shaped isolated coating film, and the resulting coating film is sufficiently washed with distilled water and dried, so that the measurement sample can be obtained.

Retort Whitening Resistance of Coating Film

A coated metal sheet was produced as described below using the coating composition for inner surface of each of Production Examples. A phosphoric acid chromate-based surface treated aluminum sheet (3104 alloy, sheet thickness: 0.27 mm) was coated with the coating composition for inner surface of each of Production Examples by a bar coater in such a manner that a dry mass of the coating film after baking was 88 mg/dm$^2$ (approximately 6.4 μm), drying was performed at 120° C. for 60 seconds, and then baking was performed at 250° C. (furnace internal temperature in the oven) for 30 seconds to produce a coated metal sheet. After the obtained coated metal sheet was cut out into a size of 2.5 cm×10 cm, retort treatment was performed at 125° C. for 30 minutes in an autoclave. After the treatment, the coated metal sheet was taken out and air-dried, and then a whitened state (presence or absence of whitening) of the coating film portion was visually evaluated. The results are shown in Table 1.

Evaluation of Covering Property of Inner Surface Coating Film (ERV Evaluation)

Evaluation of covering property of the inner surface coating film was performed as described below, for the drawn/ironed can subjected to drawing/ironing and doming as described in the above "Production of drawn/ironed can" (indicated as "without heat treatment" in the table), and the drawn/ironed can further subjected to heat treatment at 201° C. for 75 seconds in an oven (indicated as "with heat treatment" in the table).

A metal exposed portion was formed on the outer surface side of the can bottom of the drawn/ironed can, the can body was connected to the anode electrode of an enamel rater, while 360 mL of 1% salt solution was poured into the can and the cathode electrode of the enamel rater was immersed in the salt solution filled in the can, whereby a current value (ERV) after applying a voltage of 6.3 V for 4 seconds at room temperature (approximately 20° C.) was measured. The results are shown in Table 2.

Evaluation criteria are as follows:

Excellent: Current value of less than 50 mA (less than 0.18 mA/cm$^2$ per unit area)

Good: Current value of 50 mA or greater and 200 mA or less (0.18 mA/cm$^2$ or greater and 0.70 mA/cm$^2$ or less)

Marginal: Current value of higher than 200 mA and less than 700 mA (higher than 0.70 mA/cm$^2$ and less than 2.50 mA/cm$^2$)

Poor: Current value of 700 mA or greater (2.50 mA/cm$^2$ or greater)

Evaluation of Flavor Sorption Resistance (Flavor Sorption Test)

Evaluation of the flavor sorption resistance was performed as described below by using the drawn/ironed can after molded as described in the above "Production of drawn/ironed can" and subjected to heat treatment at 201° C. for 75 seconds in an oven.

A test piece with a size of 2.5 cm×5 cm was cut out around a position of 8.0 cm high from the can bottom of the drawn/ironed can, the coating film on the outer surface side was scraped with sandpaper (abrasive paper), and the resulting test piece was cleaned and dried. A 5% aqueous ethanol solution containing 2 ppm of limonene was prepared as a model flavor test solution. The model flavor test solution was placed in a glass bottle with a packing (Duran bottle), the test piece was immersed therein, and the glass bottle was sealed and stored for 2 weeks at 30° C. The test piece was taken out of the glass bottle, and after washing with water, water droplets were removed, the test piece was immersed in 50 mL of diethyl ether, sealed, and stored at room temperature round the clock. The resulting extraction liquid was concentrated in a concentrating device and GC-MS analysis (gas chromatography mass spectrometry) was performed. A component peak derived from limonene obtained from the GC-MS analysis was used to determine a sorption amount by a calibration curve, and a ratio with respect to a charged amount of limonene was determined as a limonene sorption rate (%) by the following formula (8). The results are shown in Table 2.

$$\text{Limonene sorption rate }(\%)=(\text{sorption amount of limonene}/\text{charged amount of limonene})\times 100 \quad (8)$$

Evaluation criteria are as follows:

Excellent: Limonene sorption rate is less than 2%

Good: Limonene sorption rate is 2% or greater and less than 3%

Marginal: Limonene sorption rate is 3% or greater and less than 5%

Poor: Limonene sorption rate is 5% or greater

Heat Shrinkage Rate Evaluation

Evaluation of the heat shrinkage rate was performed as described below using the inner surface coating film of the central portion of the can trunk of the drawn/ironed can of Example 6 subjected to drawing and ironing and doming as described in the above "Production of drawn/ironed can" (without heat treatment) and the drawn/ironed can of Example 6 further subjected to heat treatment at 201° C. for 75 seconds in an oven (with heat treatment).

The above drawn/ironed can was used to cut out a sample of 10 mm in the can trunk circumferential direction and 20 mm in the can height direction around the central portion of the can trunk (thinnest portion) in a direction of 0° with respect to the metal substrate rolling direction. The coating film on the can outer surface side was removed by scraping with sandpaper or the like to exposure the metal surface, and then immersed in the diluted hydrochloric acid aqueous solution to dissolve the metal substrate. Next, the coating film on the can inner surface side having a film shape was taken out, sufficiently washed with distilled water, and dried, and the resulting film-shaped coating film was cut out into 20 mm long (can height direction) with 4 mm wide (can trunk circumferential direction) to obtain the measurement sample.

The measurement sample was chucked in a thermomechanical analyzer, and the inter-chuck distance (corresponding to the initial length of the measurement portion in the height direction of the coating film) was set to 5 mm. The displacement amount of the measurement sample was measured under the following conditions, and the heat shrinkage rate in the can height direction was evaluated in a loaded state and an unloaded state:

Instrument: TMA/SS6100, available from Seiko Instruments Inc.
Temperature raising rate: 5° C./min
Temperature range: from 30° C. to 200° C.
Measurement mode: tensile mode
Load in measurement: 5 mN ($5.20\times10^5$ N/m$^2$) or no load
Inter-chuck distance: 5 mm The inter-chuck distance before measurement (corresponding to the initial length of the measurement portion of the coating film) was defined as $L_0$, the maximum value of the shrinkage amount (maximum shrinkage length) in the height direction of a portion corresponding to $L_0$ when temperature was raised from 30° C. to 200° C. at the temperature raising rate of 5° C./min while applying a load of $5.20\times10^5$ N/m$^2$ per unit area was defined as $\Delta L_1$, and a value calculated by the mathematical formula represented by the following formula (9) was defined as the heat shrinkage rate (with load). Note that for the displacement amount, shrinkage was defined as a positive value, and expansion or elongation was defined as a negative value. The results are shown below.

$$\text{Heat shrinkage rate (with load)(\%)}=(\Delta L_1/L_0)\times100 \quad (9)$$

Heat shrinkage rate of inner surface coating film of drawn/ironed can of Example 6 (without heat treatment) (with load): 68%

Heat shrinkage rate of inner surface coating film of drawn/ironed can of Example 6 (with heat treatment) (with load): 9%

In addition, the inter-chuck distance before measurement (corresponding to the initial length of the measurement portion of the coating film) was defined as $L_0$, the maximum value of the shrinkage amount (maximum shrinkage length) in the height direction of a portion corresponding to $L_0$ when temperature was raised from 30° C. to 200° C. at the temperature raising rate of 5° C./min in an unloaded state was defined as $\Delta L^2$, and a value calculated by the mathematical formula represented by the following formula (10) was defined as the heat shrinkage rate (without load). Note that for the displacement amount, shrinkage was defined as a positive value, and expansion or elongation was defined as a negative value. The results are shown below.

$$\text{Heat shrinkage rate (without load)(\%)}=(\Delta L_2/L_0)\times100 \quad (10)$$

Heat shrinkage rate of inner surface coating film of drawn/ironed can of Example 6 (without heat treatment) (without load): 69%

Heat shrinkage rate of inner surface coating film of drawn/ironed can of Example 6 (with heat treatment) (without load): 30%

Corrosion Resistance Evaluation

Evaluation of the corrosion resistance was performed as described below using the inner surface coating film of the central portion of the can trunk of the drawn/ironed can of Example 6 subjected to drawing and ironing and doming as described in the above "Production of drawn/ironed can" (without heat treatment) and the drawn/ironed can of Example 6 further subjected to heat treatment at 201° C. for 75 seconds in an oven (with heat treatment).

The above drawn/ironed can was used to cut out a test piece of 40 mm in the can trunk circumferential direction and 40 mm in the can height direction around the central portion of the can trunk (thinnest portion). A cross-cut flaw having a length of 4 cm and reaching the base metal was made into the inner surface of the test piece using a cutter, the test piece was immersed in an acidic model liquid containing salt, and after 2 weeks elapsed at 37° C., the corrosion state was evaluated. The model liquid used in the test was prepared in such a manner that salt was 0.2% and citric acid was added thereto to adjust pH to 2.5. For the evaluation criteria, around the cross-cut portion, a test piece having a maximum width of corrosion under the coating film of 1.5 mm or greater was rated Poor, a test piece having a maximum width of corrosion of 0.5 mm or greater and less than 1.5 mm was rated Good, and a test piece having a maximum width of corrosion of less than 0.5 mm was rated Excellent. The results are shown below.

Corrosion state of drawn/ironed can of Example 6 (without heat treatment): Poor

Corrosion state of drawn/ironed can of Example 6 (with heat treatment): Excellent Table 1 shows a composition of the coating composition (types of polyester resins, solid content blending ratio) in each of Production Examples, and characteristics (coating film Tg, elongation percentage, retort whitening resistance) of the coating film obtained by the coating composition of each of Production Examples, and Table 2 shows a type (Production Example number, composition) of the coating composition for inner surface used in the coated metal sheet of each of Examples and Comparative Examples, an ironing processing speed at the time of producing the drawn/ironed can, and evaluation results of the drawn/ironed can (inner surface coating film covering property, flavor sorption resistance).

TABLE 1

| | | | | | | Coating composition for inner surface Production Example | | | | |
|---|---|---|---|---|---|---|---|---|---|---|
| | | | | | | 1 | 2 | 3 | 4 | 5 |
| Coating composition for inner surface Blending | Polyester resin | Types | Tg | Acid value (mg KOH/g) | Mn | | | | | |
| | | A | 75 | 2 | 18000 | 100 | 94 | 87 | | |
| | | B | −25 | 11 | 17000 | | 6 | 13 | | |
| | | C | 85 | 2 | 18000 | | | | 100 | |

TABLE 1-continued

| | | | | | | | | | | |
|---|---|---|---|---|---|---|---|---|---|---|
| composition | | D | 65 | 2 | 20000 | | | | | 100 |
| (solid | | E | 82 | 22 | 6000 | | | | | |
| content | | F | 40 | 3 | 15000 | | | | | |
| blending | | $Tg_{mix}$ (° C.) | | | | 75 | 67 | 58 | 85 | 65 |
| ratio) | | $AV_{mix}$ (° C.) | | | | 2 | 2.5 | 3.2 | 2 | 2 |
| | Curing agent | Resol-type phenolic resin | | | | 10 | 10 | 10 | 10 | 10 |
| | | Benzoguanamine resin | | | | | | | | |
| | Curing catalyst | Dodecylbenzenesulfonic acid | | | | 0.1 | 0.1 | 0.1 | 0.1 | 0.1 |
| Coating film | | Coating film Tg (° C.) | | | | 77 | 70 | 57 | 86 | 65 |
| performance | | Elongation percentage (%) | | | | 50 | 150 | 188 | Not evaluated | Not evaluated |
| | | Retort whitening resistance | | | | No whitening | No whitening | No whitening | No whitening | No whitening |

| | | | | | | Coating composition for inner surface Production Example | | | | | |
|---|---|---|---|---|---|---|---|---|---|---|---|
| | | | | | | 6 | 7 | 8 | 9 | 10 | 11 |
| Coating composition | Polyester resin | Types | Tg | Acid value (mg KOH/g) | Mn | | | | | | |
| for inner | | A | 75 | 2 | 18000 | 90 | 90 | 100 | 80 | 70 | |
| surface | | B | −25 | 11 | 17000 | | | | 20 | 30 | |
| Blending | | C | 85 | 2 | 18000 | | | | | | |
| composition | | D | 65 | 2 | 20000 | | | | | | |
| (solid | | E | 82 | 22 | 6000 | 10 | 10 | | | | |
| content | | F | 40 | 3 | 15000 | | | | | | 100 |
| blending | | $Tg_{mix}$ (° C.) | | | | 76 | 76 | 75 | 49 | 37 | 40 |
| ratio) | | $AV_{mix}$ (° C.) | | | | 4 | 4 | 2 | 3.8 | 4.7 | 3 |
| | Curing agent | Resol-type phenolic resin | | | | 10 | | | 10 | 10 | 10 |
| | | Benzoguanamine resin | | | | | 15 | | | | |
| | Curing catalyst | Dodecylbenzenesulfonic acid | | | | 0.1 | 0.1 | | 0.1 | 0.1 | 0.1 |
| Coating film | | Coating film Tg (° C.) | | | | 80 | 82 | 75 | 49 | 43 | 41 |
| performance | | Elongation percentage (%) | | | | Not evaluated | Not evaluated | Not evaluated | 295 | 325 | Not evaluated |
| | | Retort whitening resistance | | | | No whitening | No whitening | Whitening | No whitening | No whitening | No whitening |

TABLE 2

| | | | | | | Examples | | | | |
|---|---|---|---|---|---|---|---|---|---|---|
| | | | | | | 1 | 2 | 3 | 4 | 5 |
| Coating composition for inner surface Production Example | | | | | | 1 | 2 | 3 | 4 | 5 |
| Coating composition | Polyester resin | Types | Tg | Acid value (mg KOH/g) | Mn | | | | | |
| for inner | | A | 75 | 2 | 18000 | 100 | 94 | 87 | | |
| surface | | B | −25 | 11 | 17000 | | 6 | 13 | | |
| Blending | | C | 85 | 2 | 18000 | | | | 100 | |
| composition | | D | 65 | 2 | 20000 | | | | | 100 |
| (solid | | E | 82 | 22 | 6000 | | | | | |
| content | | F | 40 | 3 | 15000 | | | | | |
| blending | | $Tg_{mix}$ (° C.) | | | | 75 | 67 | 58 | 85 | 65 |
| ratio) | Curing agent | Resol-type phenolic resin | | | | 10 | 10 | 10 | 10 | 10 |
| | | Benzoguanamine resin | | | | | | | | |
| | Curing catalyst | Dodecylbenzenesulfonic acid | | | | 0.1 | 0.1 | 0.1 | 0.1 | 0.1 |
| Molding condition | | Average processing rate (mm/sec) during ironing | | | | 5500 | 5500 | 5500 | 5500 | 5500 |
| Evaluation | Covering property of inner surface coating film | Without heat treatment | | | | Excellent | Excellent | Excellent | Excellent | Excellent |
| | | With heat treatment | | | | Excellent | Excellent | Excellent | Excellent | Excellent |
| | Flavor sorption resistance | | | | | Excellent | Excellent | Good | Excellent | Excellent |

| | | | | | | Examples | | | |
|---|---|---|---|---|---|---|---|---|---|
| | | | | | | 6 | 7 | 8 | 9 |
| Coating composition for inner surface Production Example | | | | | | 6 | 7 | 8 | 1 |
| Coating composition | Polyester resin | Types | Tg | Acid value (mg KOH/g) | Mn | | | | |
| for inner | | A | 75 | 2 | 18000 | 90 | 90 | 100 | 100 |
| surface | | B | −25 | 11 | 17000 | | | | |
| Blending | | C | 85 | 2 | 18000 | | | | |
| composition | | D | 65 | 2 | 20000 | | | | |
| (solid | | E | 82 | 22 | 6000 | 10 | 10 | | |
| content | | F | 40 | 3 | 15000 | | | | |

TABLE 2-continued

| | | | | | | | | | |
|---|---|---|---|---|---|---|---|---|---|
| blending ratio) | | $Tg_{mix}$ (° C.) | | | | 76 | 76 | 75 | 75 |
| | Curing agent | Resol-type phenolic resin | | | | 10 | | | 10 |
| | | Benzoguanamine resin | | | | | 15 | | |
| | Curing catalyst | Dodecylbenzenesulfonic acid | | | | 0.1 | 0.1 | | 0.1 |
| Molding condition | | Average processing rate (mm/sec) during ironing | | | | 5500 | 5500 | 5500 | 6800 |
| Evaluation | Covering property of inner surface coating film | Without heat treatment | | | | Excellent | Good | Excellent | Excellent |
| | | With heat treatment | | | | Excellent | Good | Excellent | Excellent |
| | Flavor sorption resistance | | | | | Excellent | Excellent | Excellent | Excellent |

| | | | | | | Comparative Examples | | | |
|---|---|---|---|---|---|---|---|---|---|
| | | | | | | 1 | 2 | 3 | 4 |
| Coating composition for inner surface Production Example | | | | | | 1 | 2 | 3 | 9 |
| Coating composition for inner surface Blending composition (solid content blending ratio) | Polyester resin | Types | Tg | Acid value (mg KOH/g) | Mn | | | | |
| | | A | 75 | 2 | 18000 | 100 | 94 | 87 | 80 |
| | | B | −25 | 11 | 17000 | | 6 | 13 | 20 |
| | | C | 85 | 2 | 18000 | | | | |
| | | D | 65 | 2 | 20000 | | | | |
| | | E | 82 | 22 | 6000 | | | | |
| | | F | 40 | 3 | 15000 | | | | |
| | | $Tg_{mix}$ (° C.) | | | | 75 | 67 | 58 | 49 |
| | Curing agent | Resol-type phenolic resin | | | | 10 | 10 | 10 | 10 |
| | | Benzoguanamine resin | | | | | | | |
| | Curing catalyst | Dodecylbenzenesulfonic acid | | | | 0.1 | 0.1 | 0.1 | 0.1 |
| Molding condition | | Average processing rate (mm/sec) during ironing | | | | 1000 | 1000 | 1000 | 1000 |
| Evaluation | Covering property of inner surface coating film | Without heat treatment | | | | Poor | Marginal | Marginal | Good |
| | | With heat treatment | | | | Poor | Poor | Poor | Marginal |
| | Flavor sorption resistance | | | | | Excellent | Excellent | Good | Poor |

| | | | | | | Comparative Examples | | |
|---|---|---|---|---|---|---|---|---|
| | | | | | | 5 | 6 | 7 |
| Coating composition for inner surface Production Example | | | | | | 10 | 9 | 11 |
| Coating composition for inner surface Blending composition (solid content blending ratio) | Polyester resin | Types | Tg | Acid value (mg KOH/g) | Mn | | | |
| | | A | 75 | 2 | 18000 | 70 | 80 | |
| | | B | −25 | 11 | 17000 | 30 | 20 | |
| | | C | 85 | 2 | 18000 | | | |
| | | D | 65 | 2 | 20000 | | | |
| | | E | 82 | 22 | 6000 | | | |
| | | F | 40 | 3 | 15000 | | | 100 |
| | | $Tg_{mix}$ (° C.) | | | | 37 | 49 | 40 |
| | Curing agent | Resol-type phenolic resin | | | | 8 | 10 | 10 |
| | | Benzoguanamine resin | | | | | | |
| | Curing catalyst | Dodecylbenzenesulfonic acid | | | | 0.1 | 0.1 | 0.1 |
| Molding condition | | Average processing rate (mm/sec) during ironing | | | | 1000 | 5500 | 5500 |
| Evaluation | Covering property of inner surface coating film | Without heat treatment | | | | Excellent | Excellent | Excellent |
| | | With heat treatment | | | | Excellent | Excellent | Excellent |
| | Flavor sorption resistance | | | | | Poor | Poor | Poor |

In the method for producing a drawn/ironed can of the disclosure, even in a case where a coated metal sheet having a coating film that has excellent flavor sorption resistance and contains a polyester resin having a high glass transition temperature as a main component is used, it is possible to suppress occurrence of a coating film defect during molding and occurrence of coating film peeling due to heat treatment after molding, and thus, it is possible to produce, with good productivity, a drawn/ironed can having an excellent coating film covering property with few metal exposure portions on the can inner surface, and excellent flavor adsorption resistance. Furthermore, the obtained drawn/ironed can has excellent flavor sorption resistance, corrosion resistance, and the like, and thus, can be preferably used for a beverage container or the like.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A method for producing a drawn/ironed can, comprising drawing and ironing a coated metal sheet to obtain a drawn/ironed can, the coated metal sheet having an inner surface coating film at least on a surface to be a can inner surface, the inner surface coating film comprising a polyester resin, wherein a glass transition temperature (Tg) of the polyester resin is 55° C. or higher, an ironing rate in the drawing and ironing is 40% or greater, and a processing speed during ironing in the drawing and ironing is 4000 mm/sec or higher.

2. The method for producing a drawn/ironed can according to claim 1, wherein the glass transition temperature of the inner surface coating film is 55° C. or higher.

3. The method for producing a drawn/ironed can according to claim 1, wherein the inner surface coating film further comprises a curing agent, and the curing agent comprises a resol-type phenolic resin and/or an amino resin.

4. The method for producing a drawn/ironed can according to claim 1, wherein the coated metal sheet further has an outer surface coating film on a surface to be a can outer surface, and the outer surface coating film comprises a polyester resin.

5. The method for producing a drawn/ironed can according to claim 1, wherein a degree of coverage of the inner surface coating film is 200 mA or less in terms of ERV.

6. The method for producing a drawn/ironed can according to claim 1, wherein heat treatment is performed at a temperature of 55° C. or higher after the drawing and ironing.

* * * * *